US009439096B2

(12) United States Patent
Josiam et al.

(10) Patent No.: US 9,439,096 B2
(45) Date of Patent: Sep. 6, 2016

(54) METHOD AND APPARATUS TO SUPPORT CHANNEL REFINEMENT AND MULTI-STREAM TRANSMISSION IN MILLIMETER WAVE SYSTEMS

(71) Applicant: Samsung Electronics Co., LTD, Suwon-si, Gyeonggi-do (KR)

(72) Inventors: Kaushik Morapakkam Josiam, Dallas, TX (US); Richard Stirling-Gallacher, Dallas, TX (US); Zhouyue Pi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 13/963,746

(22) Filed: Aug. 9, 2013

(65) Prior Publication Data

US 2014/0044044 A1    Feb. 13, 2014

Related U.S. Application Data

(60) Provisional application No. 61/682,679, filed on Aug. 13, 2012.

(51) Int. Cl.
*H04W 24/10* (2009.01)
*H04B 7/04* (2006.01)
*H04B 7/06* (2006.01)
*H04W 72/12* (2009.01)

(52) U.S. Cl.
CPC .......... *H04W 24/10* (2013.01); *H04B 7/0408* (2013.01); *H04B 7/063* (2013.01); *H04B 7/0617* (2013.01); *H04B 7/0626* (2013.01); *H04B 7/0632* (2013.01); *H04B 7/0639* (2013.01); *H04W 72/1226* (2013.01)

(58) Field of Classification Search
CPC .............. H04W 24/10; H04W 40/12; H04W 72/1226; H04B 7/0408; H04B 7/0639; H04B 7/063; H04B 7/0632; H04B 7/0626
See application file for complete search history.

(56) References Cited

U.S. PATENT DOCUMENTS

| | | | | |
|---|---|---|---|---|
| 2009/0239565 | A1* | 9/2009 | Han et al. | 455/512 |
| 2009/0322613 | A1* | 12/2009 | Bala | H04B 7/022 342/373 |
| 2010/0034146 | A1* | 2/2010 | Hou | H04B 7/024 370/328 |

(Continued)

FOREIGN PATENT DOCUMENTS

| | | |
|---|---|---|
| KR | 20090095756 A | 9/2009 |
| WO | WO 2012/096607 A1 | 7/2012 |

OTHER PUBLICATIONS

International Search Report dated Dec. 13, 2013 in connection with International Patent Application No. PCT/KR2013/007287, 4 pages.

(Continued)

*Primary Examiner* — Redentor Pasia

(57) ABSTRACT

Methods and apparatus for sending and receiving mobile station (MS) specific channel state indication reference symbols (CSI-RS) is provided. A common CSI-RS is sent from a base station (BS) and is received by an MS. First feedback is sent to the BS from the MS based on the common CSI-RS. A configuration of an MS-specific CSI-RS is sent from the BS and received by the MS. An MS specific CSI-RS is sent from the BS and is received by the MS. Second feedback is sent to the BS from the MS based on the MS specific CSI-RS.

34 Claims, 20 Drawing Sheets

(56) References Cited

U.S. PATENT DOCUMENTS

| | | | |
|---|---|---|---|
| 2010/0118989 A1* | 5/2010 | Sayana | H04L 5/0035 375/260 |
| 2010/0208633 A1* | 8/2010 | Takano | H04B 7/0634 370/310 |
| 2010/0215012 A1 | 8/2010 | Cho et al. | |
| 2010/0232525 A1* | 9/2010 | Xia | H04B 7/0626 375/259 |
| 2010/0273499 A1* | 10/2010 | van Rensburg et al. | 455/450 |
| 2011/0249588 A1* | 10/2011 | Petersson | H04B 7/0417 370/252 |
| 2012/0020230 A1 | 1/2012 | Chen et al. | |
| 2012/0051451 A1* | 3/2012 | Kwon et al. | 375/285 |
| 2012/0088458 A1 | 4/2012 | Nogami et al. | |
| 2012/0115521 A1 | 5/2012 | Tong et al. | |
| 2012/0176939 A1 | 7/2012 | Qu et al. | |
| 2013/0059619 A1 | 3/2013 | Kim et al. | |
| 2013/0235807 A1* | 9/2013 | Lee | H04W 16/28 370/329 |

OTHER PUBLICATIONS

Written Opinion of International Searching Authority dated Dec. 13, 2013 in connection with International Patent Application No. PCT/KR2013/007287, 7 pages.

Extended European Search Report dated Mar. 9, 2016 in connection with European Application No. 13879340.1, 7 pages.

\* cited by examiner

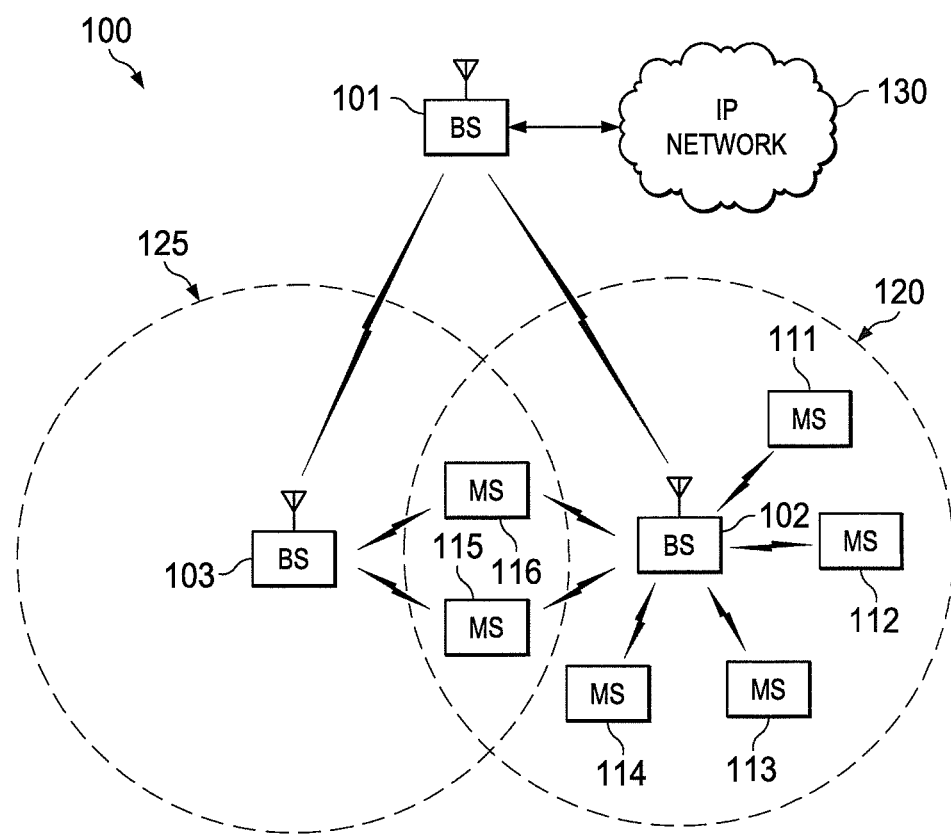

METHOD AND APPARATUS TO SUPPORT CHANNEL REFINEMENT AND MULTI-STREAM TRANSMISSION IN MILLIMETER WAVE SYSTEMS

CROSS-REFERENCE TO RELATED APPLICATION(S) AND CLAIM OF PRIORITY

The present application claims priority to U.S. Provisional Patent Application Ser. No. 61/682,679, filed Aug. 13, 2012, entitled "METHOD AND APPARATUS TO SUPPORT CHANNEL REFINEMENT AND MULTI-STREAM TRANSMISSION IN MILLIMETER WAVE SYSTEMS". The content of the above-identified patent document is incorporated herein by reference.

TECHNICAL FIELD

The present application relates generally to wireless communication system and, more specifically, to a beamformed wireless communication system.

BACKGROUND

Mobile communication has been one of the most successful innovations in modern history. In recent years, the number of subscribers to mobile communication services has exceeded 5 billion and is growing fast. At the same time, new mobile communication technologies have been developed to satisfy the increasing needs and to provide more and better mobile communication applications and services. Some examples of such systems are cdma2000 1xEV-DO systems developed by Third Generation Partnership Project 2 (3GPP2), Wideband Code Division Multiple Access (WCDMA), High Speed Packet Access (HSPA), and Long Term Evolution (LTE) systems developed by 3GPP, and mobile Worldwide Interoperability for Microwave Access (WiMAX) systems developed by the Institute for Electrical and Electronics Engineers (WEE). As more and more people become users of mobile communication systems, and more and more services are provided over these systems, there is an increasing need of a mobile communication system with larger capacity, higher throughput, lower latency, and better reliability.

Conventionally, millimeter waves refer to radio waves with wavelength in the range of 1 mm-10 mm, which corresponds to radio frequency of 30 GHz-300 GHz. These radio waves exhibit unique propagation characteristics. For example, compared with lower frequency radio waves, they suffer higher propagation loss, have poorer ability to penetrate objects, such as buildings, walls, foliage, and are more susceptible to atmosphere absorption, deflection and diffraction due to particles (e.g., rain drops) in the air. Alternatively, due to their smaller wave lengths, more antennas can be packed in a relatively small area, thus enabling high-gain antenna in small form factor. In addition, due to the aforementioned deemed disadvantages, these radio waves have been less utilized than the lower frequency radio waves. This also presents unique opportunities for new businesses to acquire the spectrum in this band at a lower cost. The International Telecommunication Union (ITU) defines frequencies in 3 GHz-30 GHz as SHF (Super High Frequency). Note that some higher frequencies in the SHF band also exhibit similar behavior as radio waves in the EHF (Extra High Frequency) band (i.e., millimeter waves), such as large propagation loss and the possibility of implementing high-gain antennas in small form factors.

Vast amount of spectrum are available in the millimeter wave band. For example, the frequencies around 60 GHz, which are typically referred to as 60 GHz band, are available as unlicensed spectrum in most countries. In the United States, 7 GHz of spectrum around 60 GHz (57 GHz-64 GHz) is allocated for unlicensed use. On Oct. 16, 2003, the Federal Communications Commission (FCC) issued a Report and Order that allocated 12.9 GHz of spectrum for high-density fixed wireless services in the United States (71-76 GHz, 81-86 GHz, and 92-95 GHz excluding the 94.0-94.1 GHz for Federal Government use). The frequency allocation in 71-76 GHz, 81-86 GHz, and 92-95 GHz are collectively referred to as the E-band. It is the largest spectrum allocation ever by FCC—50 times larger than the entire cellular spectrum.

Millimeter wave wireless communication using component electronics have existed for many years. Several companies have developed or are developing millimeter wave communication system that can achieve giga-bits per second (bps) data rate. For example, Asyrmatos Wireless developed a millimeter wave communication system that enables 10 Gbps data transfer over distances of several kilometers. Asyrmatos transceiver is based on photonics, which provides flexibility of operating in a variety of millimeter wave bands such as 140 GHz (F-Band), 94 GHz (W-Band), 70/80 GHz (E-Band), and 35 GHz (Ka-Band). As another example, GigaBeam Corp. developed multigigabit wireless technologies for the 70 GHz and 80 GHz band. However, these technologies are not suitable for commercial mobile communication due to issues such as cost, complexity, power consumption, and form factor. For example, Giga-Beam's WiFiber G-1.25 gigabit per second wireless radio requires a two-foot antenna to achieve the antenna gain required for the point-to-point link quality. The component electronics used in these systems, including power amplifiers, low noise amplifiers, mixers, oscillators, synthesizers, waveguides, are too big in size and consume too much power to be applicable in mobile communication.

Recently, many engineering and business efforts have been and are being invested to utilize the millimeter waves for short-range wireless communication. A few companies and industrial consortiums have developed technologies and standards to transmit data at giga-bps rate using the unlicensed 60 GHz band within a few meters (up to 10 meters). Several industrial standards have been developed, e.g., WirelessHD technology, European Computer Manufacturers Association ECMA-387, and IEEE 802.15.3c, with a couple other organizations also actively developing competing short-range 60 GHz giga-bps connectivity technology, such as the Wireless Gigabit Alliance (WGA) and the WEE 802.11 task group ad (TGad). Integrated circuit (IC) based transceivers are also available for some of these technologies. For example, researchers in Berkeley Wireless Research Center (BWRC) and Georgia Electronics Design Center (GEDC) have made significantly progresses in developing low-cost, low-power 60 GHz Radio Frequency Integrated Circuit (RFIC) and antenna solutions. Researchers from BWRC show that 60 GHz power amplifiers can be designed and fabricated in 130 nm bulk "digital" CMOS. A core team of researchers from BWRC co-founded SiBeam Inc. in 2004 and developed CMOS based RFIC and baseband modem for the WirelessHD technology. It is worth mentioning that the common view is that the biggest challenge of short-range 60 GHz connectivity technology is the RFIC. As such, much of the engineering efforts have been invested to develop more power efficient 60 GHz RFICs. Many of the designs and technologies can be transferred to RFIC design for other millimeter wave bands, such as the 70-80-90 GHz band. Although the 60 GHz RFIC today still suffers from low efficiency and high cost, the advancement in millimeter wave RFIC technology points to the direction of higher efficiency and lower cost, which can eventually enable communication over larger distance using millimeter wave RFICs.

SUMMARY

A method of a mobile station (MS) is provided. The MS receives a common CSI-RS from a base station (BS). The MS sends first feedback to the BS based on the common CSI-RS. The MS receives a configuration of an MS-specific CSI-RS from the BS. The MS receives an MS specific CSI-RS. The MS sends second feedback to the BS based on the MS specific CSI-RS.

A mobile station (MS) is provided. The MS comprises a transceiver and one or more processors. The one or more processors configured to receive, via the transceiver, a common CSI-RS from a base station (BS). The one or more processors configured to send, via the transceiver, first feedback to the BS based on the common CSI-RS. The one or more processors configured to receive, via the transceiver, a configuration of an MS-specific CSI-RS from the BS. The one or more processors configured to receive, via the transceiver, an MS specific CSI-RS. The one or more processors configured to send, via the transceiver, second feedback to the BS based on the MS specific CSI-RS.

A base station (BS) is provided. The base station comprises a transceiver and one or more processors. The one or more processors are configured to send, via the transceiver, a common CSI-RS to a mobile station (MS). The one or more processors are configured to receive, via the transceiver, first feedback from the MS based on the common CSI-RS. The one or more processors are configured to send, via the transceiver, a configuration for an MS specific CSI-RS to the MS. The one or more processors are configured to send, via the transceiver, an MS specific CSI-RS. The one or more processors are configured to receive, via the transceiver, second feedback from the MS based on the MS specific CSI-RS.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates a wireless network according to embodiments of the present disclosure;

DETAILED DESCRIPTION

Figure 2A:
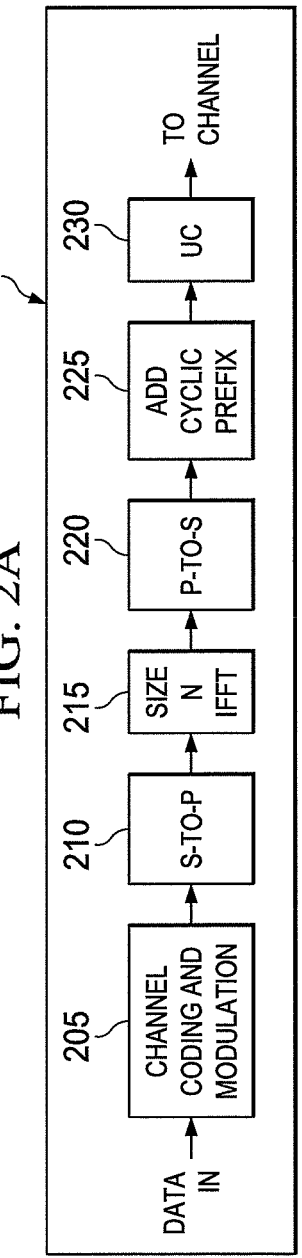
FIG. 2A illustrates a high-level diagram of a wireless transmit path according to embodiments of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following documents and standards descriptions are hereby incorporated into the present disclosure as if fully set forth herein: Millimeter wave propagation: Spectrum management implications", Federal Communications Commission, Office of Engineering and Technology, Bulletin Number 70, July, 1997; Zhouyue Pi, Farooq Khan, "An introduction to millimeter-wave mobile broadband systems", IEEE Communications Magazine, June 2011; 3GPP TS 36.201: "Evolved Universal Terrestrial Radio Access (E-UTRA); Physical Layer—General Description"; 3GPP TS 36.211: "Evolved Universal Terrestrial Radio Access (E-UTRA); Physical channels and modulation"; 3GPP TS 36.212: "Evolved Universal Terrestrial Radio Access (E-UTRA); Multiplexing and channel coding"; 3GPP TS 36.213: "Evolved Universal Terrestrial Radio Access (E-UTRA); Physical layer procedures"; 3GPP TS 36.214: "Evolved Universal Terrestrial Radio Access (E-UTRA); Physical layer—Measurements"; and B. Jeffs, et. al., "A wireless MIMO channel probing approach for arbitrary antenna arrays", Proc. of ICASSP 2001, March 2001.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes base station (BS) 101, BS 102, and BS 103. The BS 101 communicates with BS 102 and BS 103. BS 101 also communicates with Internet protocol (IP) network 130, such as the Internet, a proprietary IP network, or other data network.

Depending on the network type, other well-known teens may be used instead of "base station," such as "base station" (BS), "access point" (AP), or "eNodeB" (eNB). For the sake of convenience, the term base station (BS) shall be used herein to refer to the network infrastructure components that provide wireless access to remote terminals. In addition, the term mobile station (MS) is used herein to refer to remote terminals that can be used by a consumer to access services via the wireless communications network via that wirelessly accesses an BS, whether the MS is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The BS 102 provides wireless broadband access to network 130 to a first plurality of mobile stations (MSs) within coverage area 120 of BS 102. The first plurality of MSs includes MS 111, which may be located in a small business; MS 112, which may be located in an enterprise; MS 113, which may be located in a WiFi hotspot; MS 114, which may be located in a first residence; MS 115, which may be located in a second residence; and MS 116, which may be a mobile device, such as a cell phone, a wireless laptop, a wireless PDA, or the like. MSs 111-116 may be any wireless communication device, such as, but not limited to, a mobile phone, mobile PDA and any mobile station (MS).

BS 103 provides wireless broadband access to a second plurality of MSs within coverage area 125 of BS 103. The second plurality of MSs includes MS 115 and MS 116. In some embodiments, one or more of BS s 101-103 may communicate with each other and with MSs 111-116 using LTE or LTE-A techniques including techniques for: supporting channel refinement and multi-stream transmission in millimeter wave systems as described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace BSs 101-103 and MSs 111-116. Wired connections may replace the wireless connections depicted in FIG. 1.

Figure 2B:
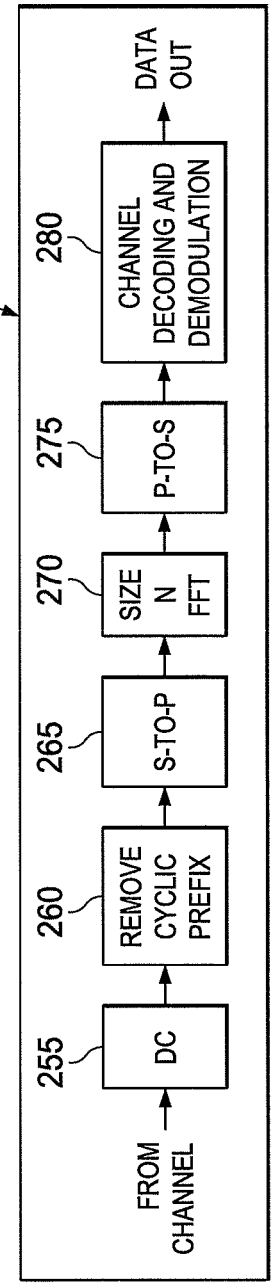
FIG. 2B illustrates a high-level diagram of a wireless receive path according to embodiments of the present disclosure.

FIG. 2A is a high-level diagram of a wireless transmit path. FIG. 2B is a high-level diagram of a wireless receive path. In FIGS. 2A and 2B, the transmit path 200 may be implemented, e.g., in BS 102 and the receive path 250 may be implemented, e.g., in a MS, such as MS 116 of FIG. 1. It will be understood, however, that the receive path 250 could be implemented in a BS (e.g., BS 102 of FIG. 1) and the transmit path 200 could be implemented in a MS. In certain embodiments, transmit path 200 and receive path 250 are configured to perform methods for: supporting channel refinement and multi-stream transmission in millimeter wave systems as described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2A and 2B may be implemented in software while other components may be implemented by configurable hardware (e.g., one or more processors) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and MS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at MS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of BSs 101-103 may implement a transmit path that is analogous to transmitting in the downlink to MSs 111-116 and may implement a receive path that is analogous to receiving in the uplink from MSs 111-116. Similarly, each one of MSs 111-116 may implement a transmit path corresponding to the architecture for transmitting in the uplink to BSs 101-103 and may implement a receive path corresponding to the architecture for receiving in the downlink from BSs 101-103.

Figure 3:
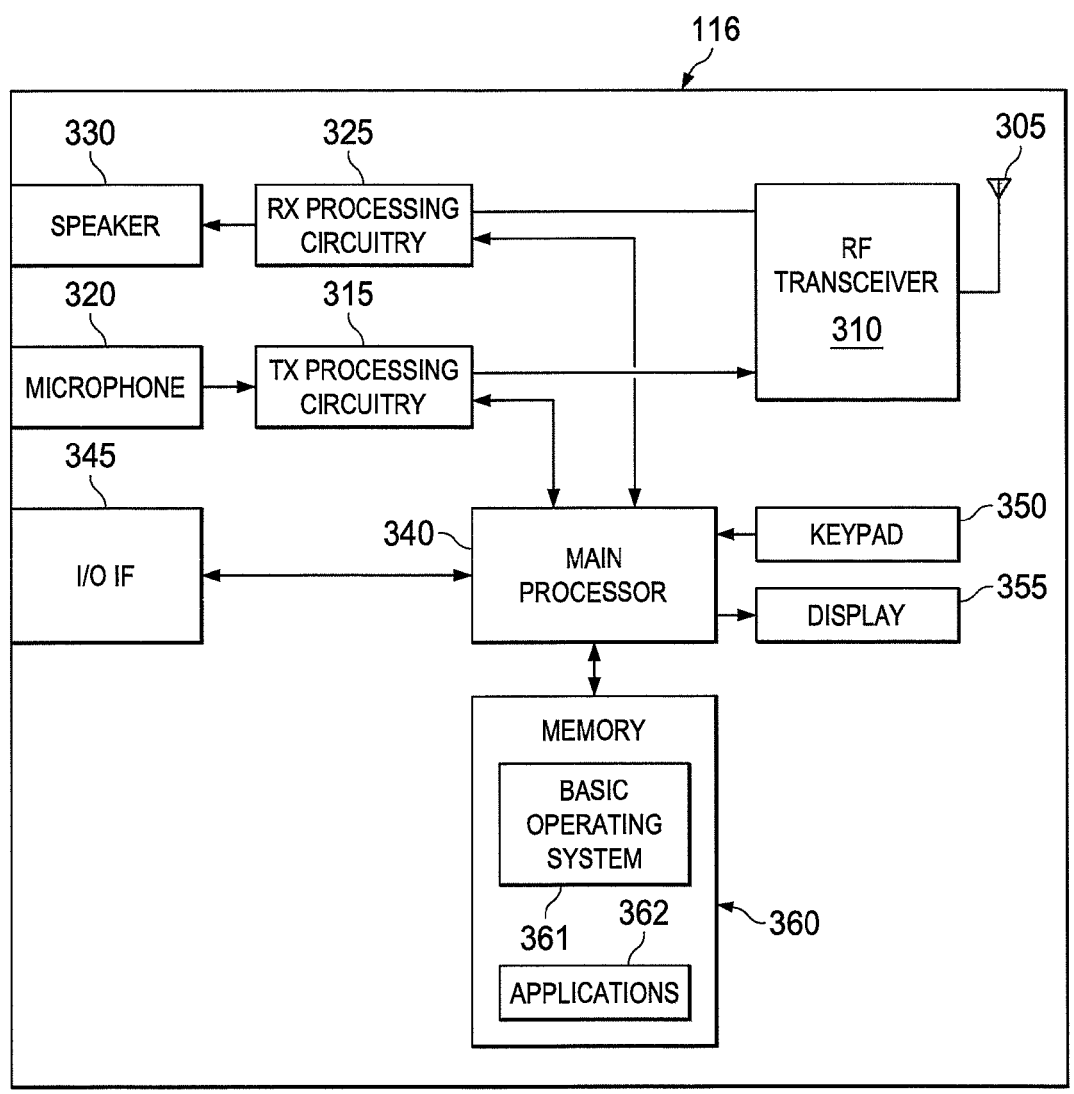
FIG. 3 illustrates a subscriber station according to embodiments of the present disclosure.

FIG. 3 illustrates a mobile station according to embodiments of the present disclosure. The embodiment of mobile station, such as MS 116, illustrated in FIG. 3 is for illustration only. Other embodiments of the wireless subscriber station could be used without departing from the scope of this disclosure. Although MS 116 is depicted by way of example, the description of FIG. 3 can apply equally to any of MS 111, MS 112, MS 113, MS 114 and MS 115

MS 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a plurality of applications 362.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 can be comprised of one or more processors and executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for: supporting channel refinement and multi-stream transmission in millimeter wave systems as described in embodiments of the present disclosure. Main processor 340 can move data into or out of memory 360, as required by an executing process. In some embodiments, the main processor 340 is configured to execute a plurality of applications 362, such as applications for coordinated multipoint (CoMP) communications and multi-user multiple input multiple output (MU-MIMO) communications, including uplink control channel multiplexing in beamformed cellular systems. Main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Embodiments of the present disclosure describe communication systems and associated apparatus and methods that utilize millimeter electromagnetic waves for mobile communication. Certain embodiments of the disclosure are applicable in other communication mediums and wavelengths, e.g., radio waves with frequency of 10 GHz-30 GHz that exhibit similar properties as millimeter waves. In some cases, the embodiments of the disclosure are also applicable to electromagnetic waves with terahertz frequencies, infrared, visible light, and other optical media. For illustrative purpose, the term "cellular band" and "millimeter wave band" are used where "cellular band" refers to frequencies around a few hundred megahertz to a few gigahertz and "millimeter wave band" refers to frequencies around a few tens of gigahertz to a few hundred gigahertz. A distinction is that the radio waves in cellular bands have less propagation loss and can be better used for coverage purpose but may require large antennas. Radio waves in millimeter wave bands suffer higher propagation loss but lend themselves well to high-gain antenna or antenna array design in a small form factor.

Figure 4:
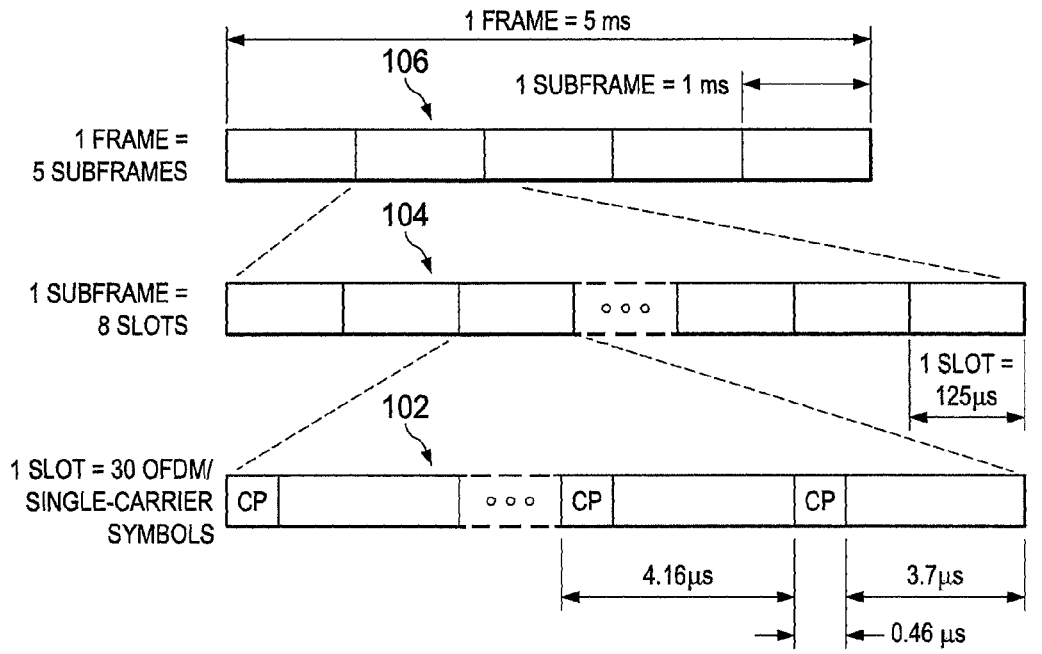
FIG. 4 illustrates a frame structure of a fifth generation (5G) wireless communication system.

FIG. 4 illustrates a frame structure of a fifth generation (5G) wireless communication system. The embodiment illustrated in FIG. 4 is for illustration only. Other embodiments could be used without departing from the scope of this disclosure.

OFDM symbols are grouped into slot 102 for scheduling granularity. For example, 30 OFDM symbols form a slot in a 5G system. 8 slots form subframe 104 and 5 subframes form frame 106. These different granularities like symbol, slot, subframe and frame illustrate the granularity for transmitting data, control and reference symbols. Each OFDM symbol is 4.16 us long, a slot made up of 30 OFDM symbols is 125 us long; subframe 104 is 1 ms long and frame 106 is 5 ms long.

The disclosure relates to a system that uses antenna arrays to form directional beams. A transmitter transmits using one of numerous directional beams that provide maximum power gain called a transmit beamforming gain at the receiver. The receiver also uses a directional beam generated by using appropriate weights applied to an antenna array to receive the signal transmitted by the transmitter. The power gain at the receiver is called the receive beamforming gain. When this antenna array is "operated" synchronously, they form a beam whose gain can make up for the higher propagation loss. Operating the antenna synchronously requires transmitting the same signal over antennas with different phase shifts. The phase shifts can just be the path length difference for the transmitted wave from a given antenna measured with reference to a reference antenna in the array. There are many other ways for computing and applying the phase shifts. The phase shifts for an antenna array are called analog weight vectors. The weighted signal from different antennas form a beam in a specified spatial direction. Two parameters define the directional beam produced by an antenna array: the angle of the directional beam measured with respected to the plane in which the antennas are arranged and the width of the directional beam called the beam width determined by the weights and the number of antennas in the array. We focus on planar arrays in this disclosure the techniques described in this disclosure can be performed with non-planar antenna arrays.

Specifically, we focus on a cellular network where the wireless connection is between the BS and the MS. In a downlink, the BS transmits data to the MS using transmit beamforming while the MS receives the data from the BS using the receive beamforming. On an uplink, this relation is reversed where MS transmits using spatial beams and BS receives the data using receive beamforming. The channel between the BS and MS on the downlink can be represented by a sum of discrete ray paths:

$$C(\theta,\phi)=\Sigma_{\{k=1\}}^{\{K\}}\beta_k e^{\{j\psi_k\}}\delta(\phi-\Phi_k,\theta-\Theta_k) \quad \text{Equation (1)}$$

where $\Phi_k$ and $\Theta_k$ are the departure and arrival angles respectively for the $k^{\{th\}}$ ray in the channel from the transmit array to the receive array. The values $\Phi_k$ and $\Theta_k$ are random variables with known distributions. $\beta_k$ is Rayleigh distributed with a random mean drawn from a double exponential distribution and $\psi_k$ is uniform $(0, 2\pi)$.

Figure 5:
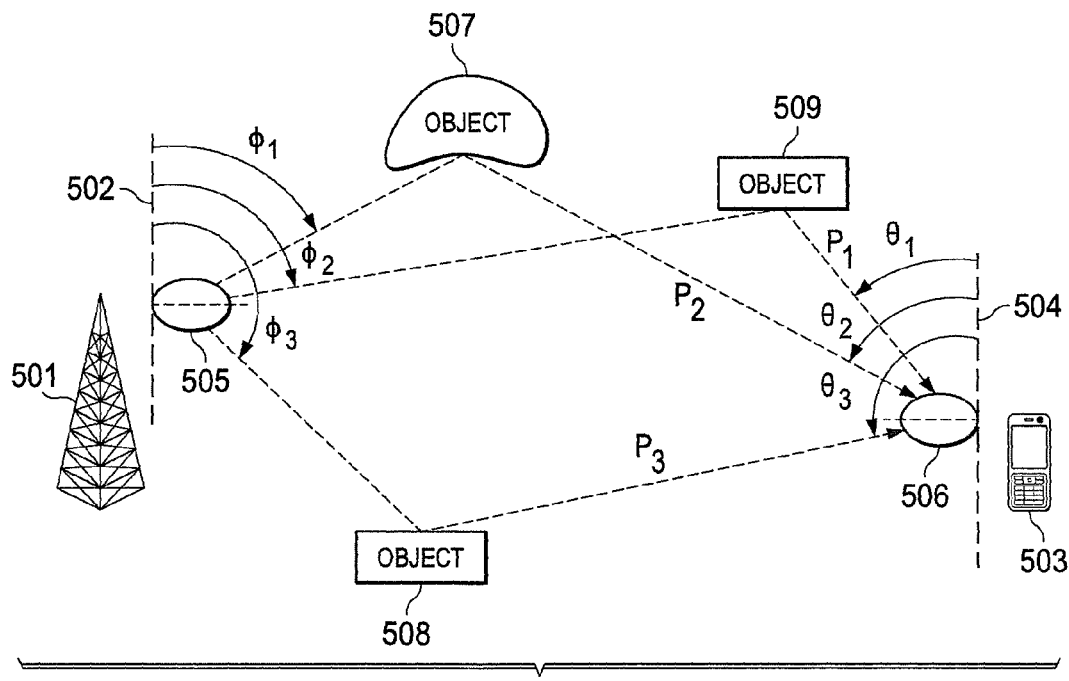
FIG. 5 illustrates a multipath channel from a BS to an MS according to embodiments of the present disclosure.

FIG. 5 illustrates a multipath channel from BS 501 to MS 503. BS 501 and MS 503 are embodiments of BS 101 of FIG. 1 and MS 116 of FIG. 1 respectively. The embodiment illustrated in FIG. 5 is for illustration only. Other embodiments could be used without departing from the scope of this disclosure.

As illustrated in FIG. 5, the channel between base station 501 and mobile station 503 is identified by a three path channel each with a specific angle of departure $\Phi_k$ and a specific angle of arrival $\Theta_k$. Antenna array 502 at BS 501 forms spatial beam 505 while antenna array 504 at MS 503 forms spatial beam 506. In the absence of a direct path to MS 503, the transmitted electromagnetic wave is reflected at least once by objects 507, 508 and 509 before it reaches the receiver.

Figure 6:
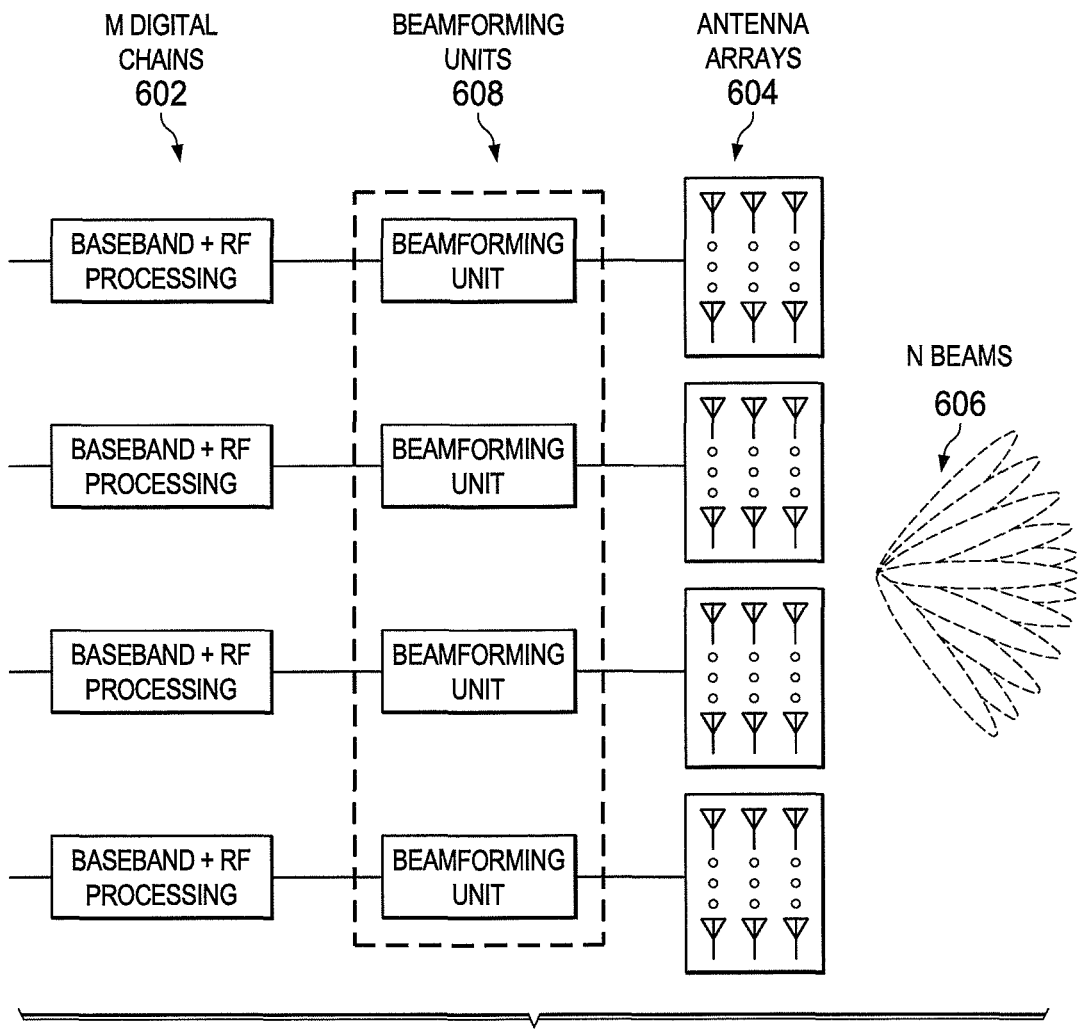
FIG. 6 illustrates a transceiver architecture according to embodiments of the present disclosure.
Figure 7:
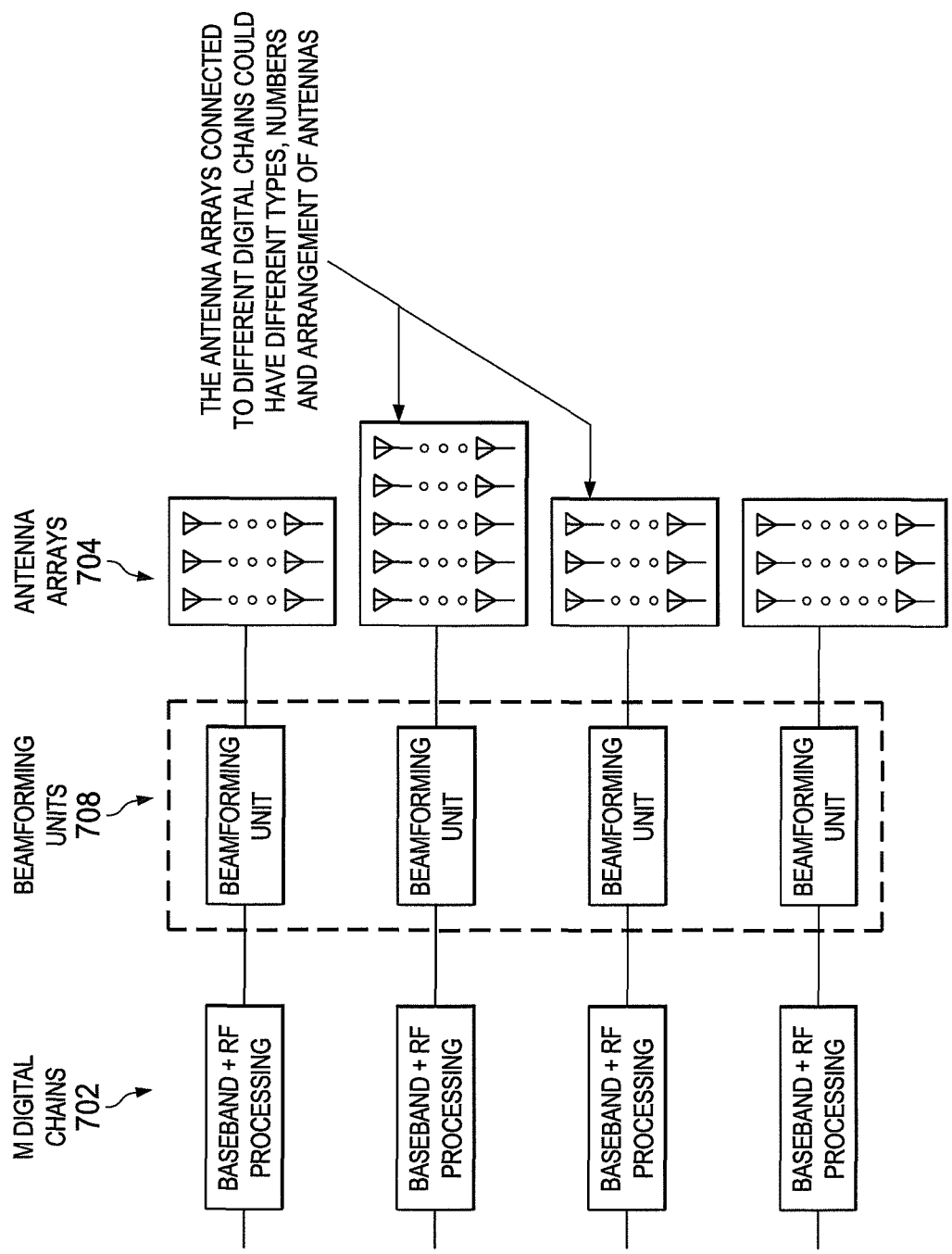
FIG. 7 illustrates a transceiver architecture using various antenna arrays according to embodiments of the present disclosure.
Figure 8:
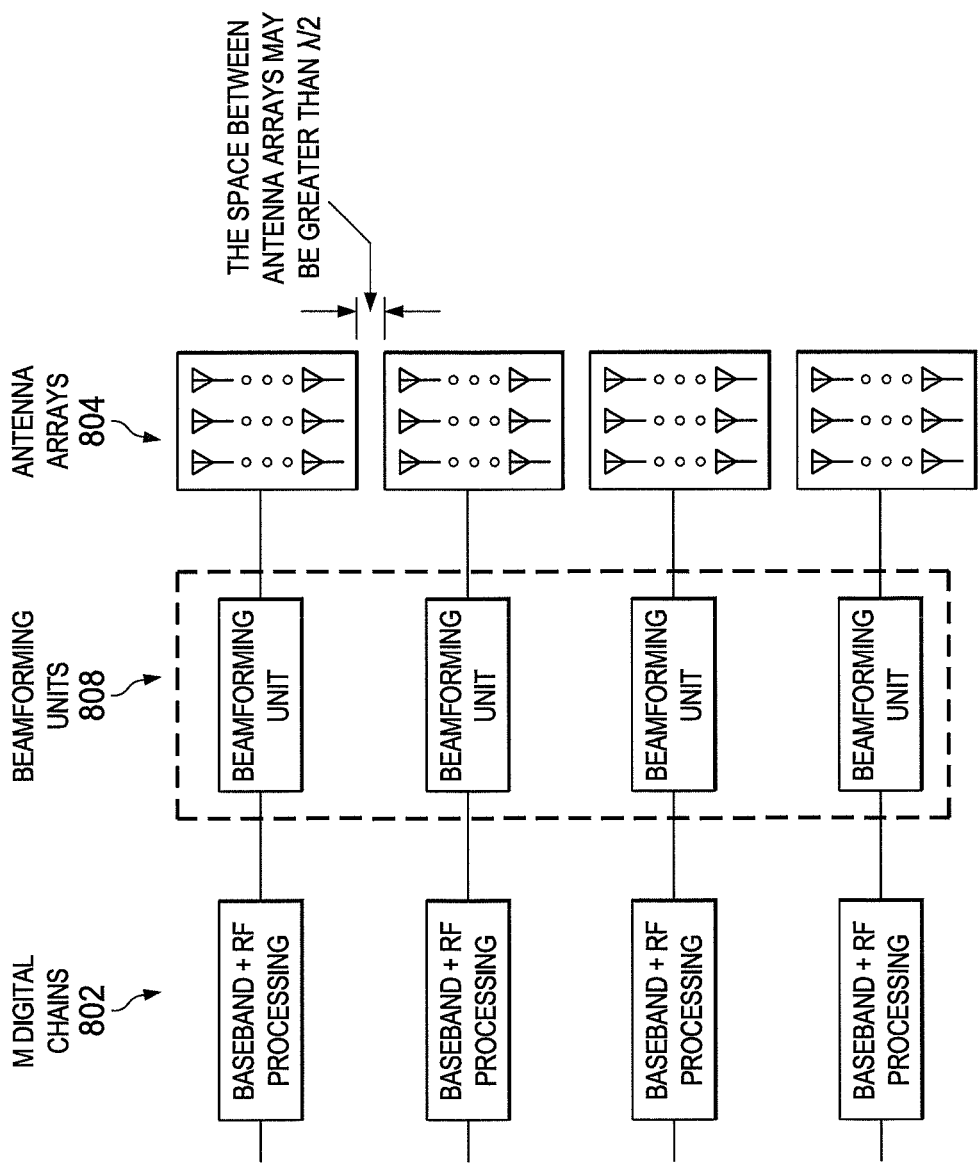
FIG. 8 illustrates a transceiver architecture using various antenna spacings according to embodiments of the present disclosure.

FIGS. 6-8 illustrate transceiver architectures using various antenna arrays and spacings. The embodiments illustrated in FIGS. 6-8 are for illustration only. Other embodiments could be used without departing from the scope of this disclosure.

The system under consideration here has M transmit digital chains 602 and N spatial beams 606. Each of the M digital chains 602 are connected to one of the multiple antenna arrays 604 with antenna elements that can be steered using one of multiple beamforming units 608 in one of the N spatial directions called beams. The transmitter's (MS or BS) numerous antennas are arranged as an array and connected through different phase shifters to the analog processing chain that has power amplifiers and other components in this pathway. The analog processing chain is preceded by the digital baseband chain which contains an OFDMA processing pathway. A digital chain comprises the digital baseband chain and the analog processing chain connected to the antenna array through phase shifters.

The system illustrated in FIG. 6 can have several variations. Certain embodiments, such as that illustrated in FIG. 7, have the number of antennas that form each array of the multiple antenna arrays 704 being different for one or more of M digital chains 702. Also important to the type of beam formed and the beamforming gain is the difference in arranging the antennas in each of the antenna array. Since the numbers of antennas and their arrangement have a direct impact on the beamforming gain that can be extracted from the antennas, they can impact system performance.

Another variation of significance is the spacing between different antenna arrays. An antenna array is defined as the set of antennas connected to a digital chain via a beamforming unit. A typical architecture shown in FIG. 6 assumes that all antennas irrespective of the digital chains they are connected to are spaced at half wavelength distance apart, where the wavelength denoted by $\lambda$ is defined as the ratio of the speed of light to the carrier frequency. While the antenna elements in an array that are connected to a digital chain have to be separated from each other by $$\frac{\lambda}{2}$$

to prevent grating lobes that adversely impact the beamforming gain from occurring, this is not a requirement for the antenna elements between to different arrays. The transceiver architecture and placements of interconnects may dictate how these antenna arrays connected to different digital chains are to be arranged. Increasing the spacing between antenna arrays beyond $$\frac{\lambda}{2},$$

as in FIG. 8, can impact the correlation of the channel as observed from each of the digital chains to a particular receiver. Therefore, this scenario is important to consider when estimating channels between different digital chains at the transmitter and the receiver.

Any combination of different number of antennas connected to each antenna array and different spacing between antenna arrays can be derived from the variations shown in FIG. 7 and FIG. 8.

Figure 9:
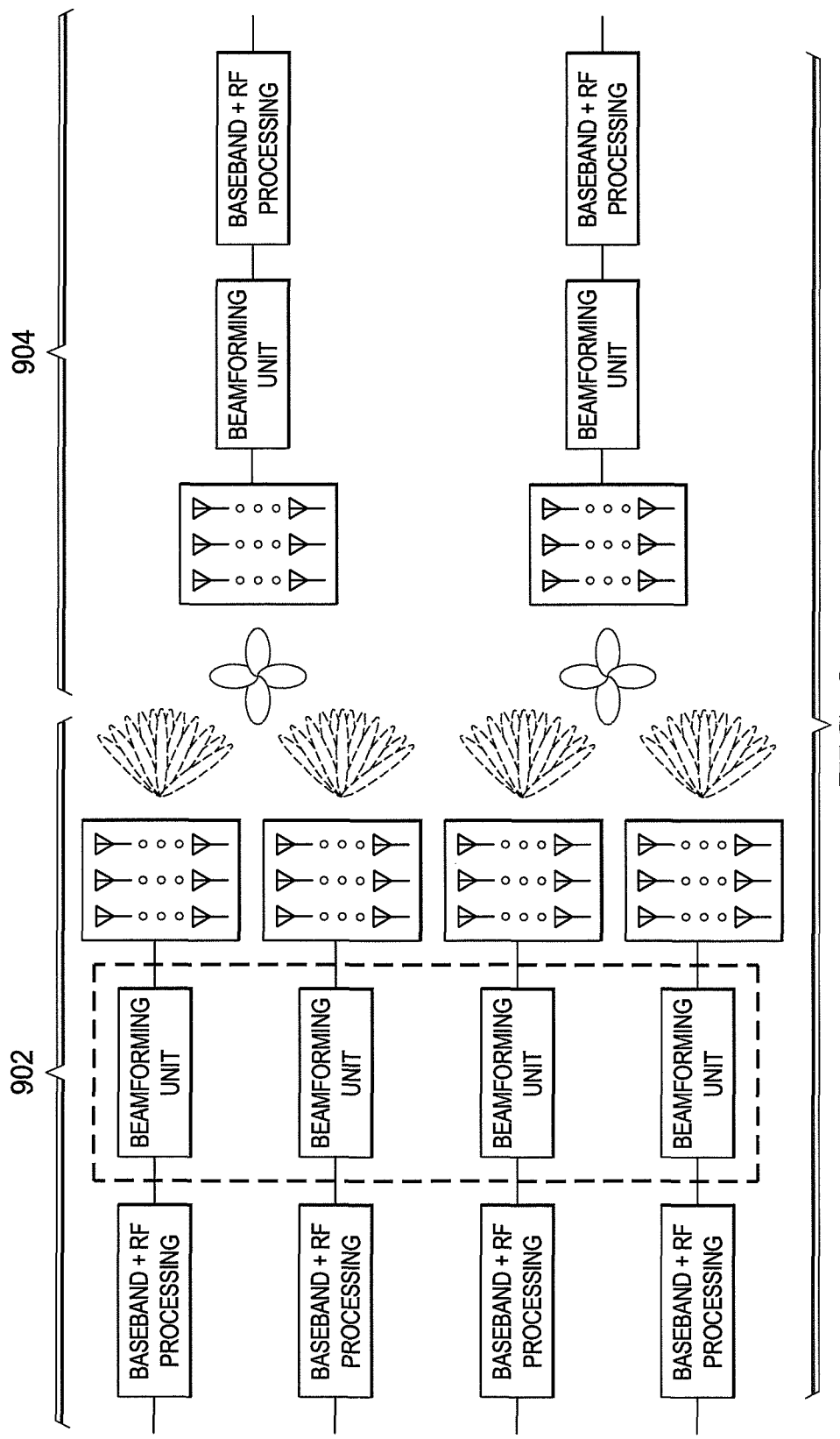
FIG. 9 illustrates transmit receive chains that use beamforming to transmit and receive data in certain specific spatial directions according to embodiments of the present disclosure.

FIG. 9 illustrates transmit receive chains that use beamforming to transmit and receive data in certain specific spatial directions. The embodiment illustrated in FIG. 9 is for illustration only. Other embodiments could be used without departing from the scope of this disclosure.

Transmit and receive beamforming is used by transmitter 902 and receiver 904 respectively for data transmission using specific spatial directions. The number of digital chains at transmitter 902 and receiver 904 determine a number of concurrent beam directions that can be deployed to transmit and receive data. For the arrangement shown in FIG. 9, the number of spatial directions that can be concurrently chosen are 4 and 2 at transmitter 902 and receiver 904 respectively and are defined by the number of transmit and receive digital chains comprised respectively by transmitter 902 and receiver 904. For any general system with M digital chains, there can be M beams that can be transmitted or received concurrently. Beams correspond to spatial directions.

The amount of training symbols required to measure the channel between the transmitter and receiver and to choose specific beam directions can be configured by the system. The number of training symbols, also called reference symbols, is determined based on the overhead, system configuration, estimation methods, etc. In certain embodiments, where the system transmits reference symbols called Channel State Information—Reference Symbols (CSI-RS) using time, frequency and spatial staggering, a training method may include two phases, where a first phase includes CSI-RS transmission that is common to all users and a second phase that includes user specific CSI-RS that is specifically used to refine the channel parameter estimates for a single user. This may be agnostic to the channel estimation procedure/algorithm followed at the receiver.

Figure 10:
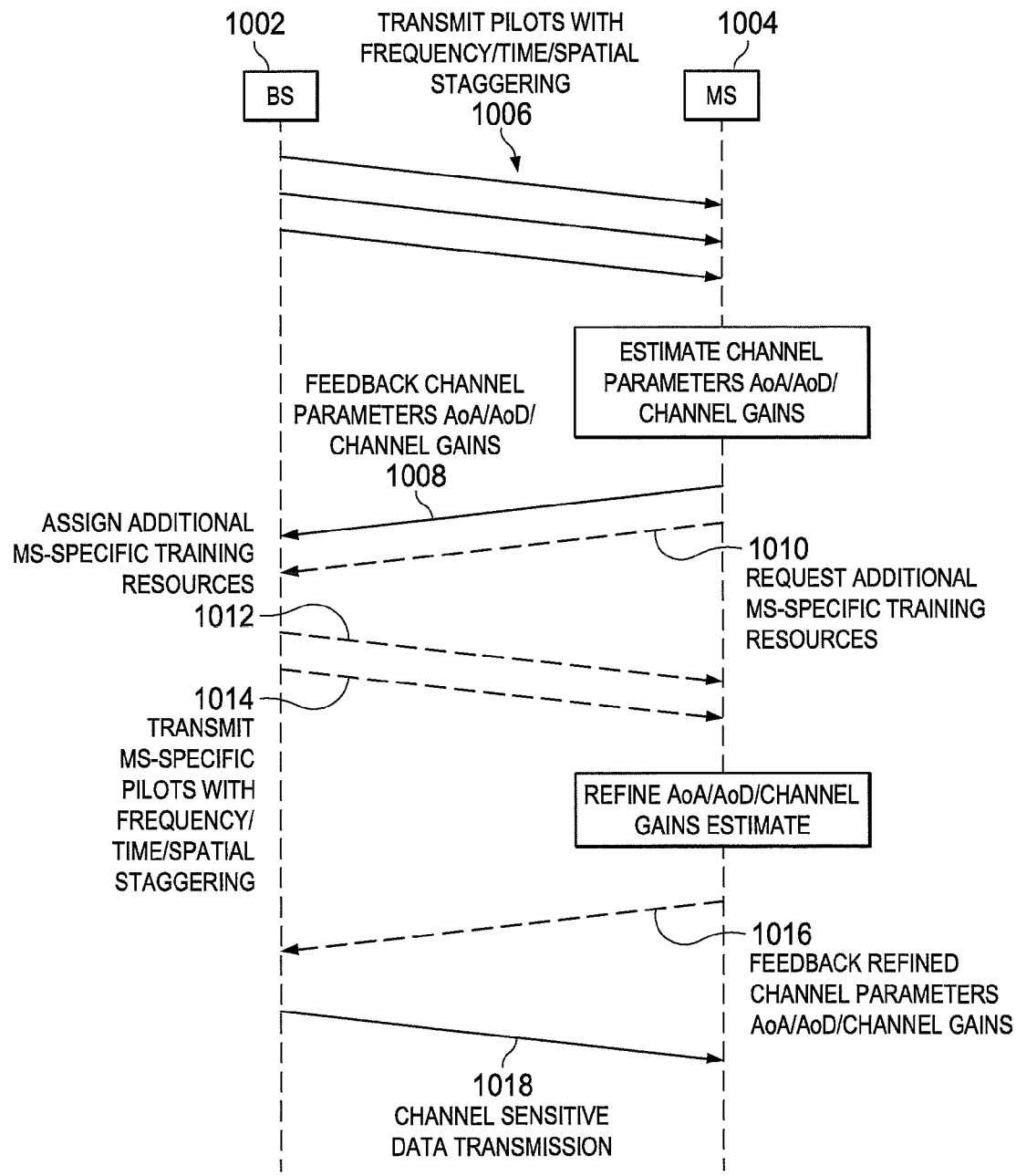
FIG. 10 illustrates a message diagram for channel parameter estimation and refinement procedures using frequency, time, and spatial staggering according to embodiments of the present disclosure.

FIG. 10 illustrates a message diagram for channel parameter estimation and refinement procedure using frequency, time, and spatial staggering. MS 1004 and BS 1002 are embodiments of MS 116 of FIG. 1 and BS 102 of FIG. 1, respectively. The embodiments illustrated in FIG. 10 are for illustration only. Other embodiments could be used without departing from the scope of this disclosure.

BS 1002 configures an MS specific training transmission for MS 1004 to refine the reported channel parameters that were estimated using the common CSI-RS. As an example, consider a scheme where the receiver uses a channel estimation algorithm to estimate the multipath channel's gain, phase, angle of arrival (AoA), and angle of departure (AoD). BS 1002 transmits pilots with frequency, time, and spatial staggering at 1006. MS 1004 transmits the estimated channel parameters using the feedback channel at 1008. The BS on receiving the feedback may indicate that additional training for refining the channel parameters are to be transmitted at 1012 in specific spatial directions based on feedback received from the MS. The additional MS specific training may be transmitted at the request of MS 1004 at 1010. The CSI-RS specific to MS 1004 sent at 1014 is used to refine the channel estimates which are then fed back to the BS using another instance of the feedback channel at 1016. Channel sensitive the data transmission occurs between BS 1002 and MS 1004 at 1018.

Figure 11:
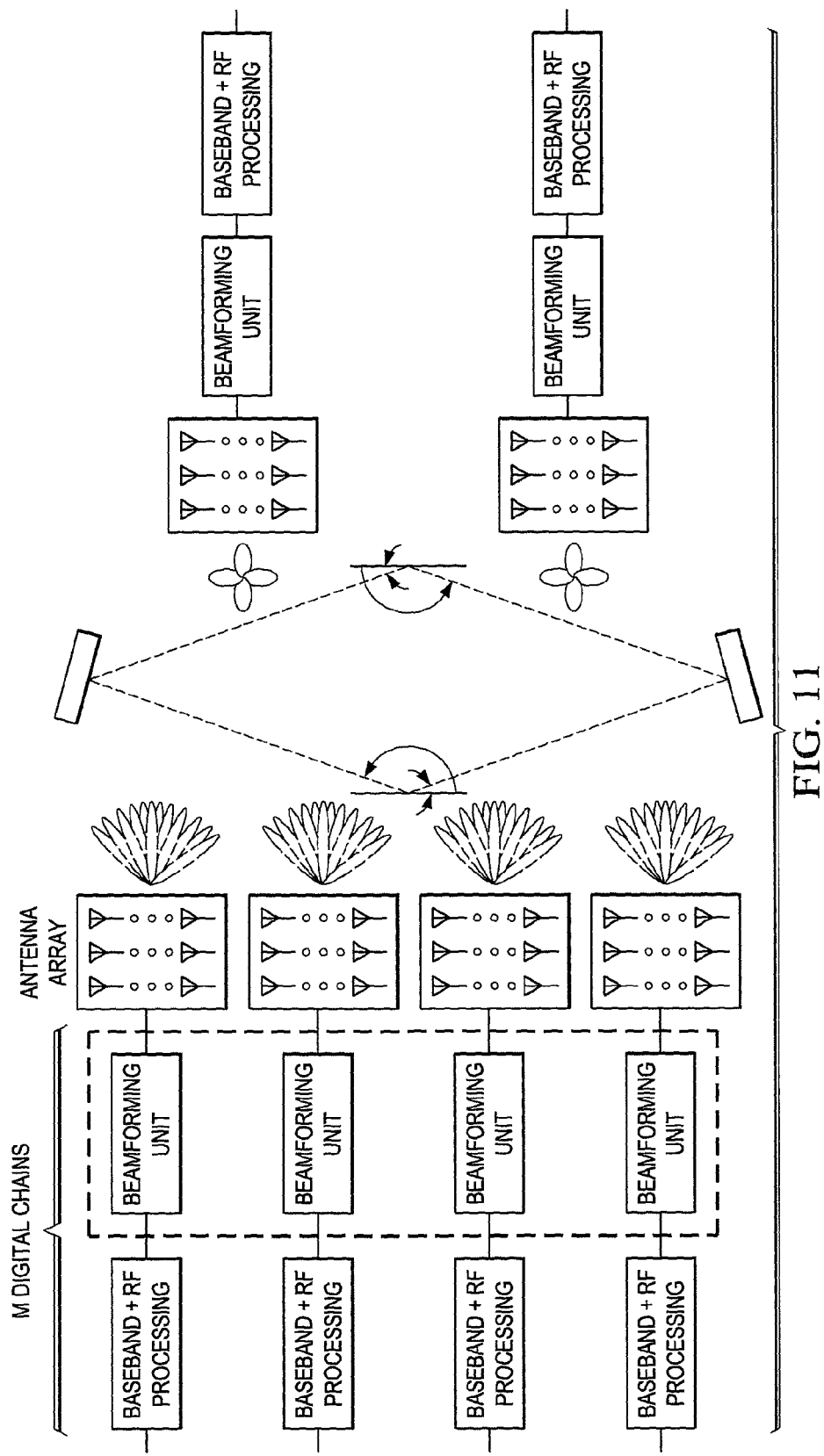
FIG. 11 illustrates a diagram showing a two path channel between a transmitter and receiver that has different AoA, AoD and Channel gains according to embodiments of the present disclosure.
Figure 12:
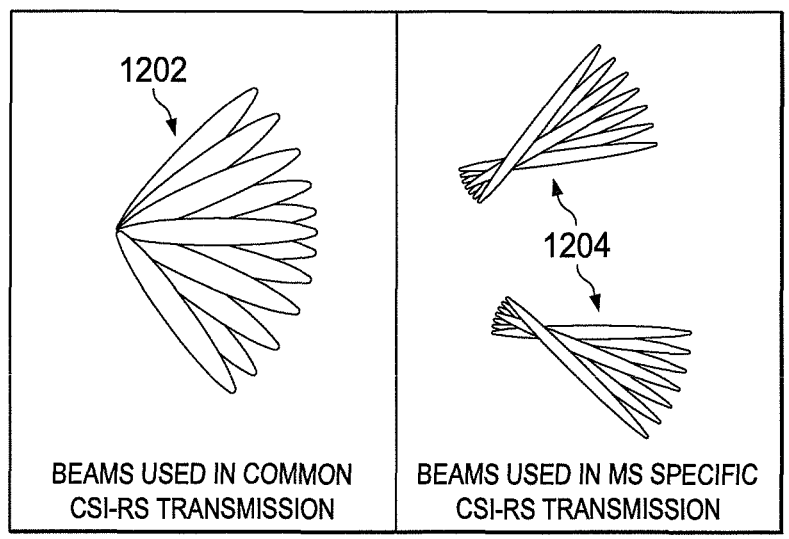
FIG. 12 illustrates the difference in the beams used for the common and MS specific CSI-RS transmission for a channel according to embodiments of the present disclosure.

FIG. 11 illustrates a diagram showing a two path channel between transmitter and receiver that has different AoA, AoD and Channel gains. FIG. 12 illustrates the difference in the beams used for the common and MS specific CSI-RS transmission for a channel. The embodiments illustrated in FIGS. 11 and 12 are for illustration only. Other embodiments could be used without departing from the scope of this disclosure.

Consider a channel with two paths between the BS and MS, as in FIG. 11, where each path may have different AoA, AoD, channel phase, and gain. The common CSI-RS transmitted to all MSs from the BS is used by the MS to estimate AoA, AoD, gain, and phase of each path. The common CSI-RS is transmitted using spatial beams 1202 in all directions. Given an estimate of a channel, the MS specific CSI-RS can be used to improve the estimate by targeting the reference symbols in the directions specified by the initial estimate reported from the MS to the BS using an uplink feedback channel. The MS specific CSI-RS is transmitted using spatial beams 1204 in certain directions. In addition to the direction specificity, the MS specific CSI-RS may have different half power beam-width, different beamforming gains and different overhead from the common CSI-RS. This difference is illustrated in FIG. 12, where the MS specific CSI-RS is transmitted only in the directions of the channel paths.

For those familiar in the art, the BS is a general transmitting device and mobile station is a general receiving device. The use of terms BS and MS is not meant to be limit the context to a cellular system and can be applied to any other wireless network. Also, the procedure outlined in the embodiment can be applied to an uplink network where the BS may request additional channel sounding reference symbols to be transmitted in specific directions specified by the BS to refine the uplink channel estimates in addition to the general sounding reference symbols transmitted as per allocation by the BS.

Figure 13:
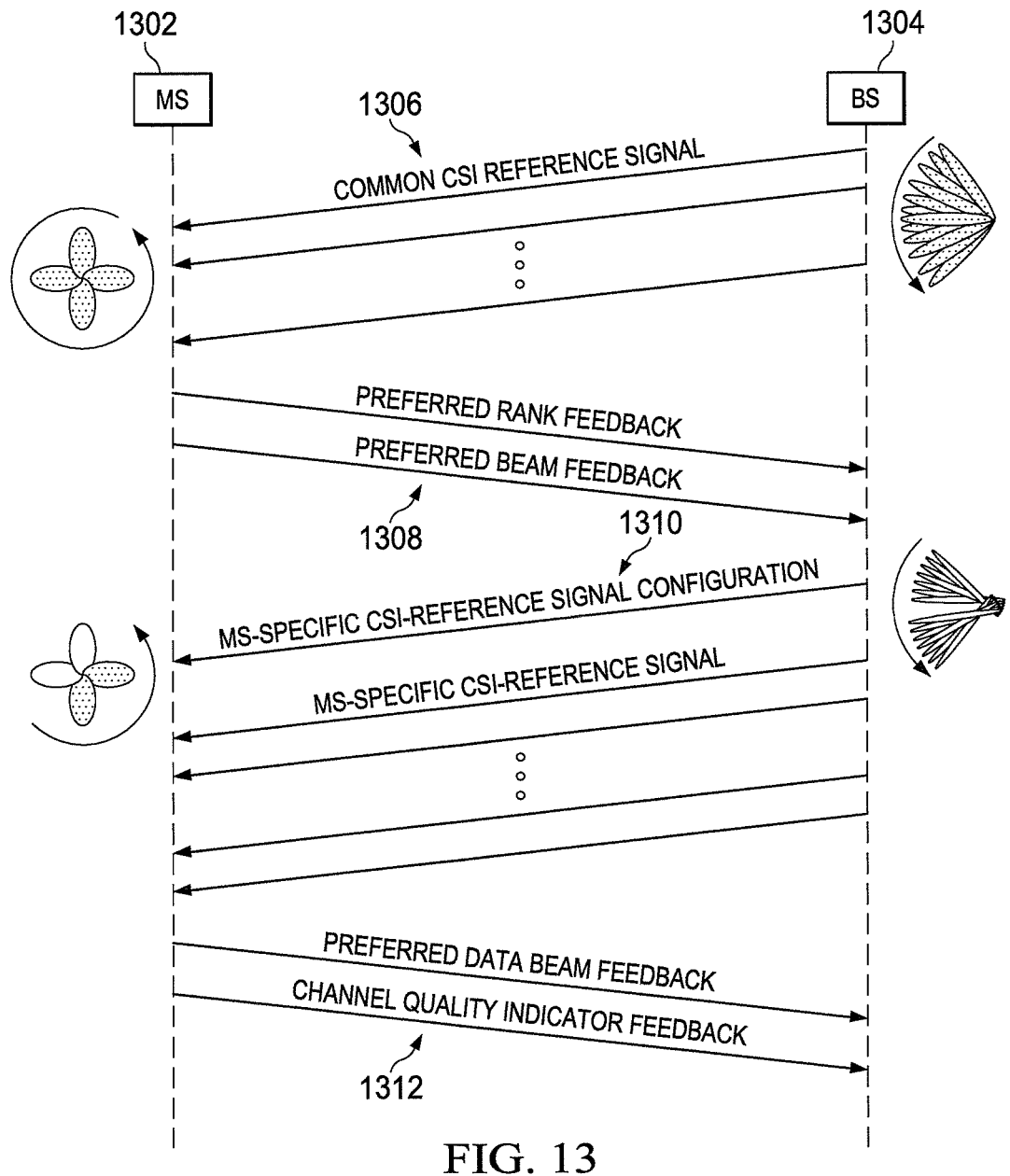
FIG. 13 illustrates an information exchange between MS 1302 and BS 1304 for a BS configured MS specific CSI-RS reference symbol according to embodiments of the present disclosure.

FIG. 13 illustrates information exchange between MS 1302 and BS 1304 for BS configured MS specific CSI-RS reference symbol. MS 1302 and BS 1304 are embodiments of MS 116 of FIG. 1 and BS 102 of FIG. 1, respectively. The embodiments illustrated in FIG. 13 are for illustration only. Other embodiments could be used without departing from the scope of this disclosure.

The flow of information between BS 1304 and MS 1302 to enable MS specific reference symbol transmission and feedback is indicated in FIG. 10. At 1306, BS 1304 transmits the common CSI-Reference signal to enable scanning across all different directions supported by BS 1304 and the MSs connected to BS 1304, including MS 1302. All MSs are expected to transmit feedback parameters based on the channel sensed using common CSI-RS. At 1308, MS 1304 transmits preferred rank feedback and preferred beam feedback to BS 1304. This feedback from the MS may be in the form of channel parameters like angle of arrival and angle of departure or in terms of the preferred beam indices where the indices refer to the beams used in common CSI-RS transmission and rank information of the channel. Based on the feedback, BS 1304 may configure a reference signal transmission for specific MS 1302 and transmit, at 1310, the configuration message about the MS specific CSI-RS transmission to MS 1302. This configuration message is unicast to the particular MS 1302. In some cases, when a group of MSs is signaled together, the configuration message may be multicast to the group of MSs. Following the configuration message, the MS receives MS specific CSI-RS. The processing of the MS specific CSI-RS yield channel quality indicator and preferred data beam indices feedback which is transmitted to the BS on a feedback channel at 1312.

In certain embodiments, the type of feedback required by the BS following transmission of MS specific CSI-RS may be indicated in the MS specific CSI-RS configuration message. In certain embodiments, the MS specific CSI-RS may involve beams that are to be used for data transmission to the MS.

Figure 14:
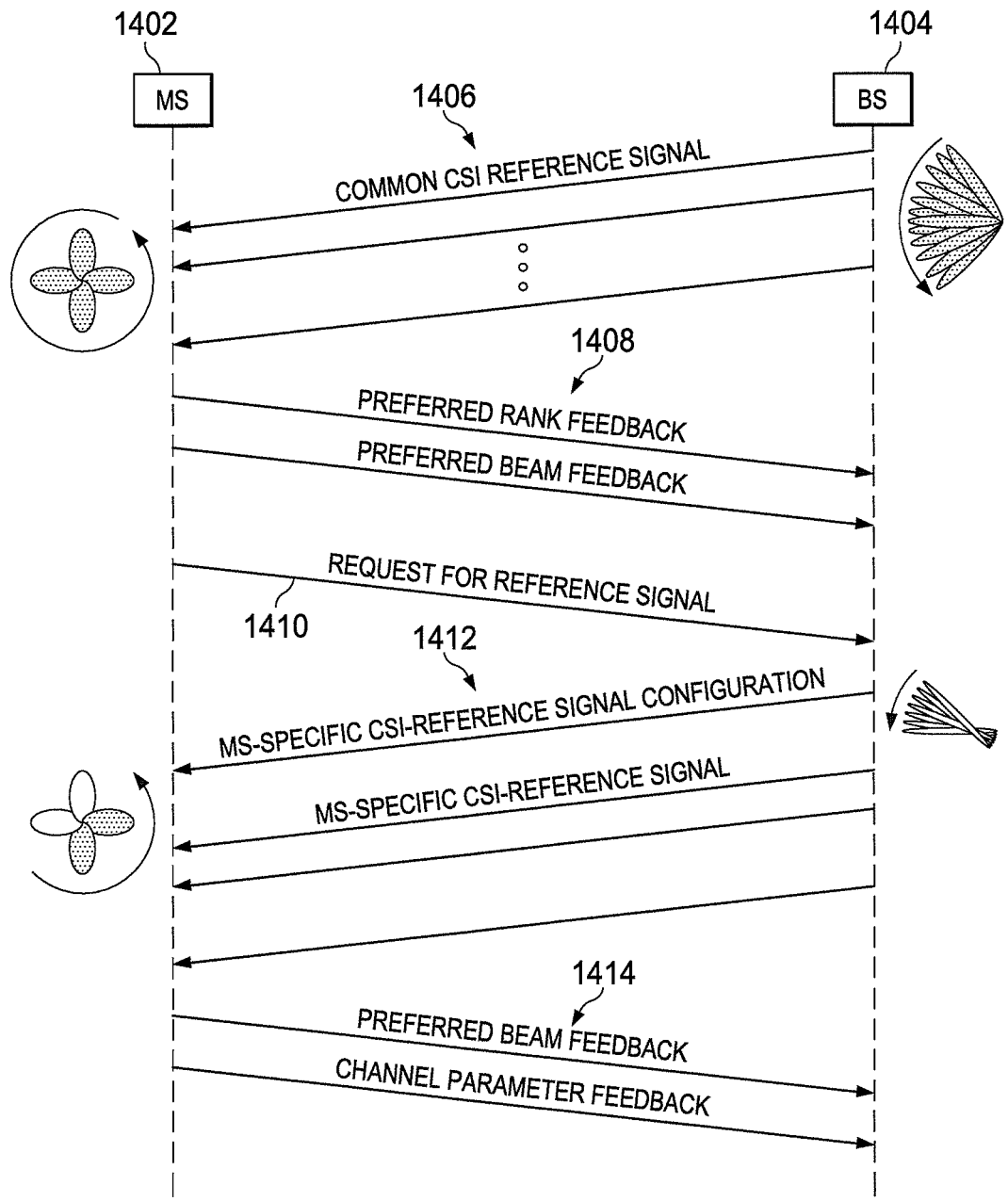
FIG. 14 illustrates an information exchange between an MS and a BS when an MS specific CSI-RS is requested by the MS according to embodiments of the present disclosure.

FIG. 14 illustrates information exchange between MS 1402 and BS 1404 when MS specific CSI-RS is requested by MS 1402. MS 1402 and BS 1404 are embodiments of MS 116 of FIG. 1 and BS 102 of FIG. 1, respectively. The embodiments illustrated in FIG. 14 are for illustration only. Other embodiments could be used without departing from the scope of this disclosure.

MS 1402, after processing the common CSI-Reference signals received from BS 1404 at 1406 and transmitting a channel state feedback in terms of the rank and preferred beam index at 1408, transmits at 1410 a message to request additional reference signals for further channel acquisition. In certain embodiments, MS 1402 indicates in the message the directions in which BS 1404 should transmit the MS specific reference symbols. In certain embodiments, the request from MS 1402 does not indicate the specific beams in which the BS should transmit additional reference symbols; BS 1404 uses the feedback information received at 1408 from MS 1402 to select the beams for MS specific CSI-RS transmission. In certain embodiments, MS 1402 is an advanced receiver configured to estimate channel parameters, like AoA and AoD, and provide this feedback of the channel parameters after processing the MS specific CSI-RS transmission.

In addition to allowing the refinement of the channel estimates, MS specific training can be used to accommodate the difference in the transmit antenna array configurations and the spacing between the antenna arrays between different digital chains as illustrated in FIGS. 7 and 8. MS specific training allows the system to trade-off the overhead between common CSI-RS symbols and the MS specific CSI-RS symbols. The use of MS specific training permits using a low overhead for common CSI-RS symbols that may result in low system level overhead of the reference symbols while allowing support for different architecture and channel estimate refinement.

The case for MS specific training can also be made for enabling multiple stream transmissions. Unlike fourth generation (4G) orthogonal frequency division multiple access (OFDMA) systems where the number of streams and the associated beams for each stream can be different from sub-carrier to sub-carrier and all digital chains may be used for the multi-stream transmission, the unique transmitter configuration of millimeter wave systems that use analog beamforming fixes the beam for an entire OFDM symbol. Therefore, if one were to use all digital chains for a multi-rank transmission to an MS, then multiplexing different users with different beamforming requirements may be difficult. Also, millimeter wave cellular systems may support space division multiple access (SDMA) and MU-MIMO by flexibly allocating digital chains to transmit data to different users. Therefore, a case is to be made to allow for flexibly allocating the digital chains for each stream in a multi-stream transmission. This flexibility may be allowed using MS-specific CSI-RS transmission to choose the digital chains after an initial rank assessment has been made using the common CSI-RS transmission.

Once rank and spatial beam direction estimates are indicated by an MS using common CSI-RS symbols, the BS may send additional MS specific CSI-RS symbols on those chosen spatial beams involving different combinations of digital chains to estimate a preferred base-band precoder and the number of digital chains to be used in the transmission. The MS specific CSI-RS symbols may involve different number of digital chains to transmit in a specific spatial direction and different number of digital chains for different spatial directions identified by the MS. The number of digital chains to be involved in a MS specific CSI-RS may be determined by the BS using parameters like scheduling overhead, current load, and the like. A rate of update of the RF precoder index that determines the spatial beam direction and a rate of update of digital baseband digital precoder from the MS may be different and may be configured depending on a number of common and MS Specific CSI-RS used by the BS. In certain embodiments, rank and RF precoder choice may be updated infrequently and estimated using common CSI-RS symbols; digital baseband precoder may be updated based on the frequency of MS specific training symbols and is dependent on the RF precoder.

Figure 15:
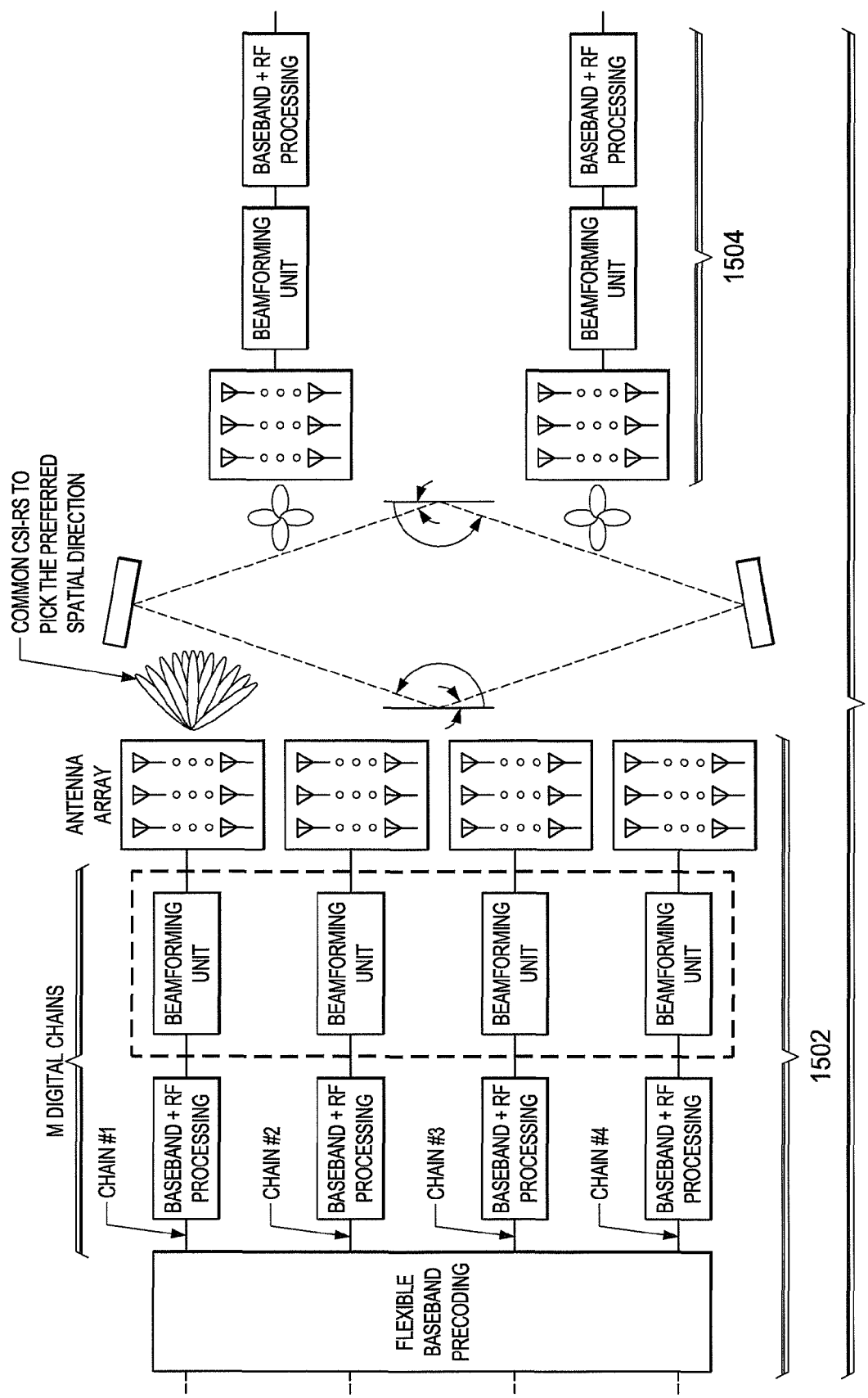
FIG. 15 illustrates a first phase of a procedure where the BS uses common CSI-RS to first choose the spatial direction according to embodiments of the present disclosure.
Figure 16:
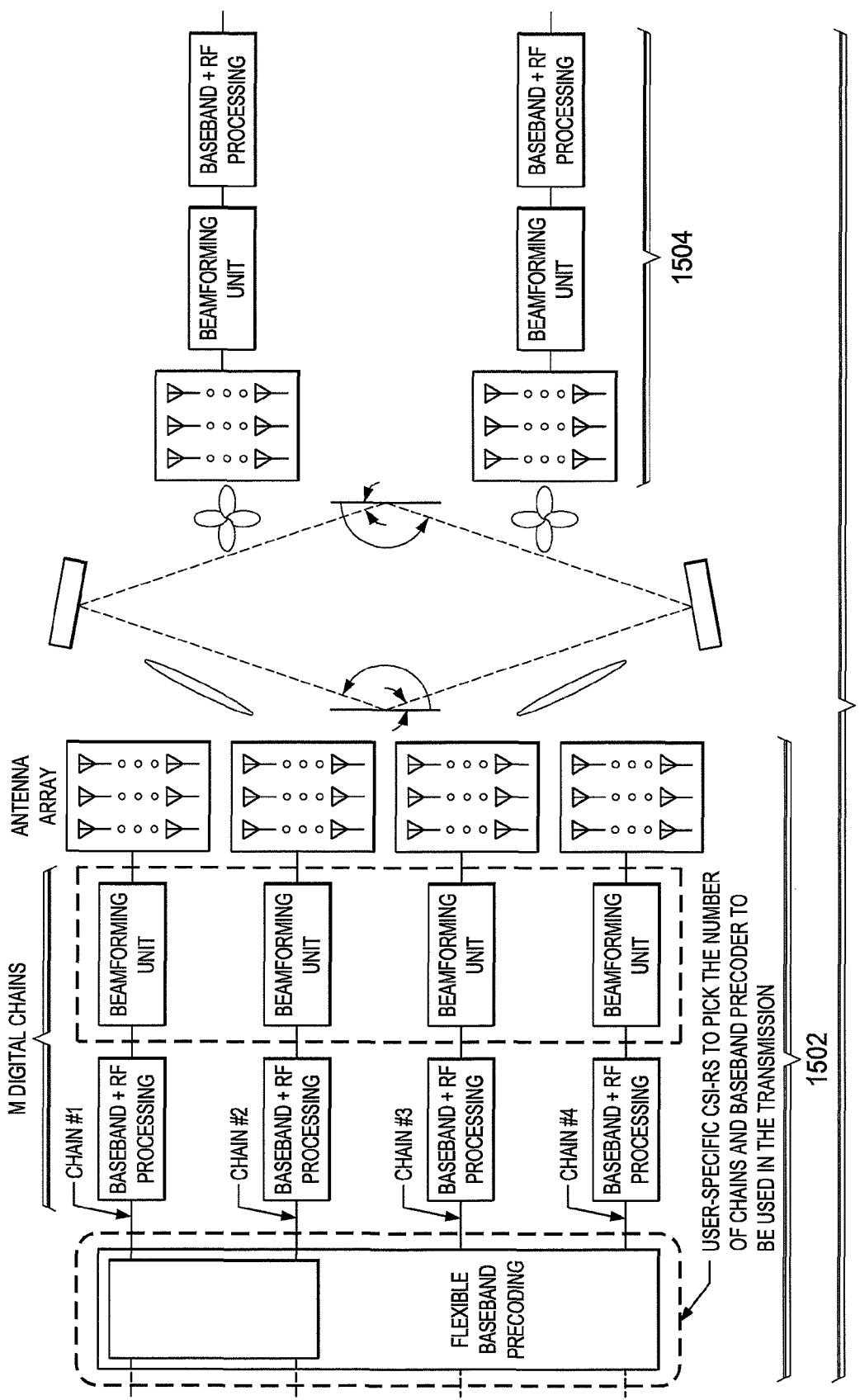
FIG. 16 illustrates a second phase of a procedure showing user specific CSI-RS transmitted in specific spatial beams on chains #1 and #2 to determine the baseband precoder according to embodiments of the present disclosure.

FIG. 15 illustrates a first phase of a procedure where the BS uses common CSI-RS to first choose the spatial direction. FIG. 16 illustrates a second phase of a procedure showing user specific CSI-RS transmitted in specific spatial beams on chains#1 and #2 to determine the baseband precoder. Transmitter 1502 and receiver 1504 of FIGS. 15 and 16 are embodiments of a transmitter of BS 102 of FIG. 1 and a receiver of MS 116 of FIG. 1. The embodiments illustrated in FIGS. 15 and 16 are for illustration only. Other embodiments could be used without departing from the scope of this disclosure.

In the example of the first phase, as shown in FIG. 15, the common CSI-RS is used to pick the preferred spatial directions from the N spatial directions based on the angle of departure that the channel as reported by MS 116. For the second phase, shown in FIG. 16, user specific CSI-RS is used to pick the base band precoder on the specified number of chains that BS 102 is willing to use in the multi-stream transmission to MS 116. In the example illustrated in FIG. 16, two baseband chains, Chain #1 and Chain #2 are used for transmitting over the two AoDs indicated through feedback from MS 116. The number of digital chains used in training and transmission may be transparent to the MS or be explicitly signaled.

By sharing the overhead between common CSI-RS and MS specific CSI-RS, the system can accommodate the estimation of channel parameters that change slowly by common CSI-RS while the estimation of parameters that change more frequently and impact the system performance are done using MS-specific CSI-RS. Common CSI-RS is a constant overhead while MS-specific CSI-RS is an "on-demand" overhead.

Figure 17:
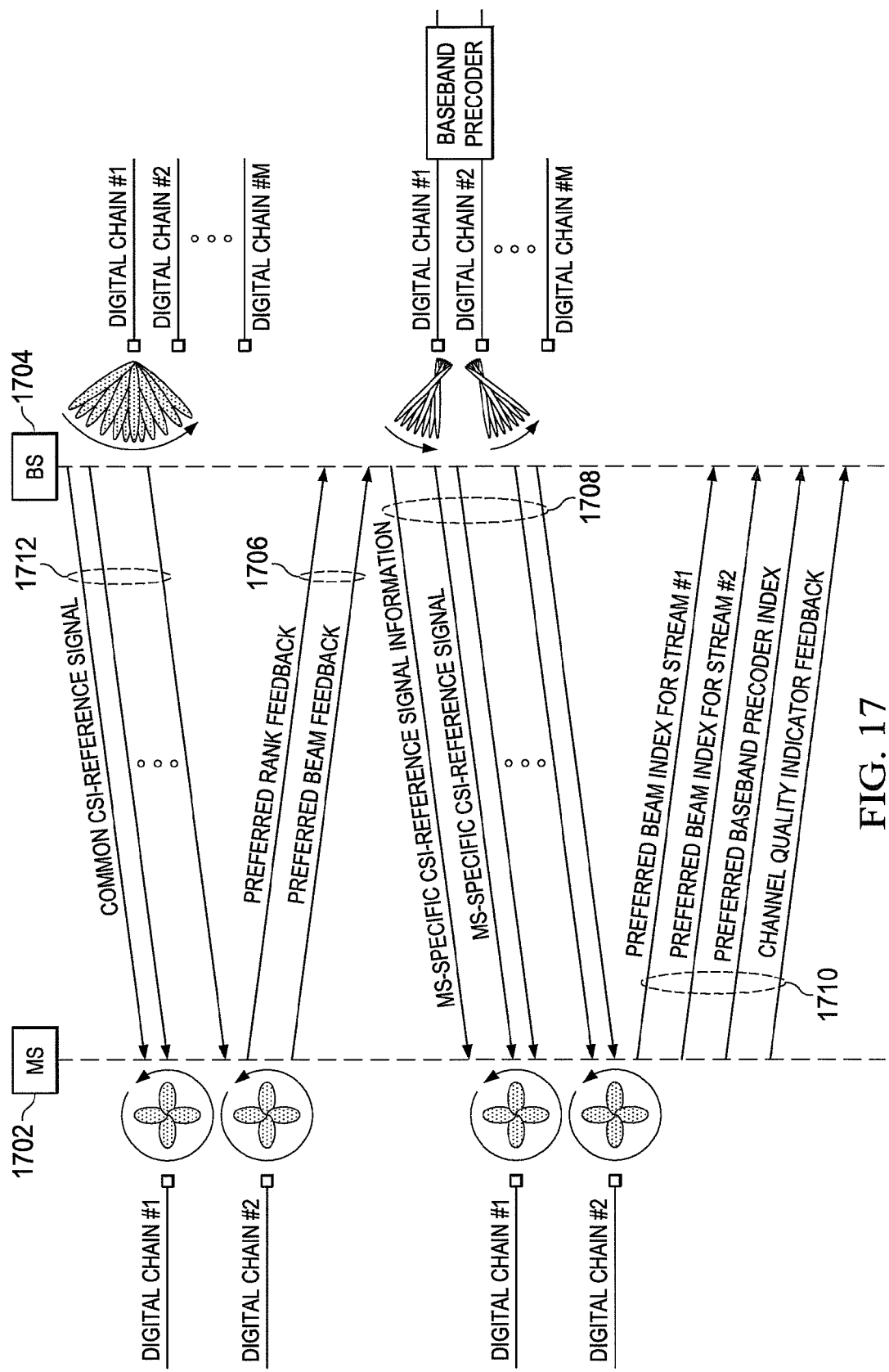
FIG. 17 illustrates information exchange between MS and BS for configuring reference signal transmission and feedback according to embodiments of the present disclosure.

FIG. 17 illustrates information exchange between MS and BS for configuring reference signal transmission and feedback. MS 1702 and BS 1704 are embodiments of MS 116 and BS 102, respectively. The embodiments illustrated in FIG. 17 are for illustration only. Other embodiments could be used without departing from the scope of this disclosure.

At 1712, the common CSI-RS is transmitted using a set of digital resources and received by the MS. At 1706, feedback regarding the rank and the preferred beam indices is provided from MS 1702 to BS 1704. Following the feedback, regarding the rank and the preferred beam indices, the base station may configure the MS specific CSI-RS transmission closer to the time when MS 1702 is to be scheduled. At 1708, BS 1704 transmits the MS specific CSI-RS on specific digital chains which BS 1704 may use to transmit data for MS 1702. MS 1702 uses the MS specific CSI-RS to derive preferred beam indices for the rank, base band precoder and channel quality indicator. At 1710, these parameters are fed back to BS 1704 for data scheduling.

Figure 18:
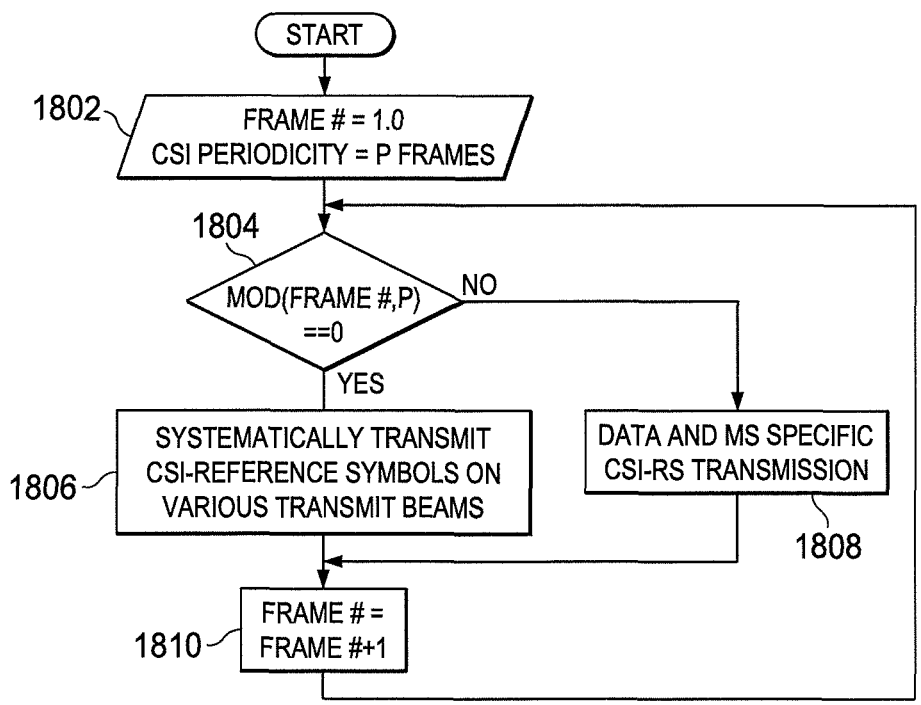
FIG. 18 illustrates a flowchart for periodic common CSI reference signal transmission according to embodiments of the present disclosure.

FIG. 18 illustrates a flow chart for periodic common CSI reference signal transmission. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example is implemented in, for example, one or more of a base station and a mobile station. BS 102 and MS 116 can each comprise one or more digital or analog processors configured to perform one or more steps depicted in the flow diagram of FIG. 18.

In certain embodiments, the common CSI-RS is a periodically scheduled transmission from BS 102 to all MSs in the system. The flowchart detailing the trigger for the common CSI-RS transmission is shown in FIG. 18 where, at 1802, a periodicity parameter is defined. At 1804 a frame number is compared with the periodicity using a modulus. If the modulus of the frame number and the periodicity is equal to zero, then at 1806, BS 102 systematically transmits CSI RS on various transmitted beams to each MS connected to the BS. If the modulus of the frame number and the periodicity does not equal zero, then at 1808 data and MS specific CSI RS are transmitted to specific MS 116 on that frame. A frame is a certain duration of time comprising numerous OFDM symbols. Other terms like slot, subframe, super frame may be used instead of frame without deviating from the scope of this disclosure. At 1810, after a transmission at either 1808 or 1806, the frame number is incremented and the process is repeated, looping back to 1804.

The periodicity may be advertised to all MSs by the BS in a broadcast message. MS specific CSI-RS transmission happens in time slots that don't carry CSI-RS and are not periodic. MS specific CSI-RS transmissions are scheduled as desired by the BS.

Figure 19:
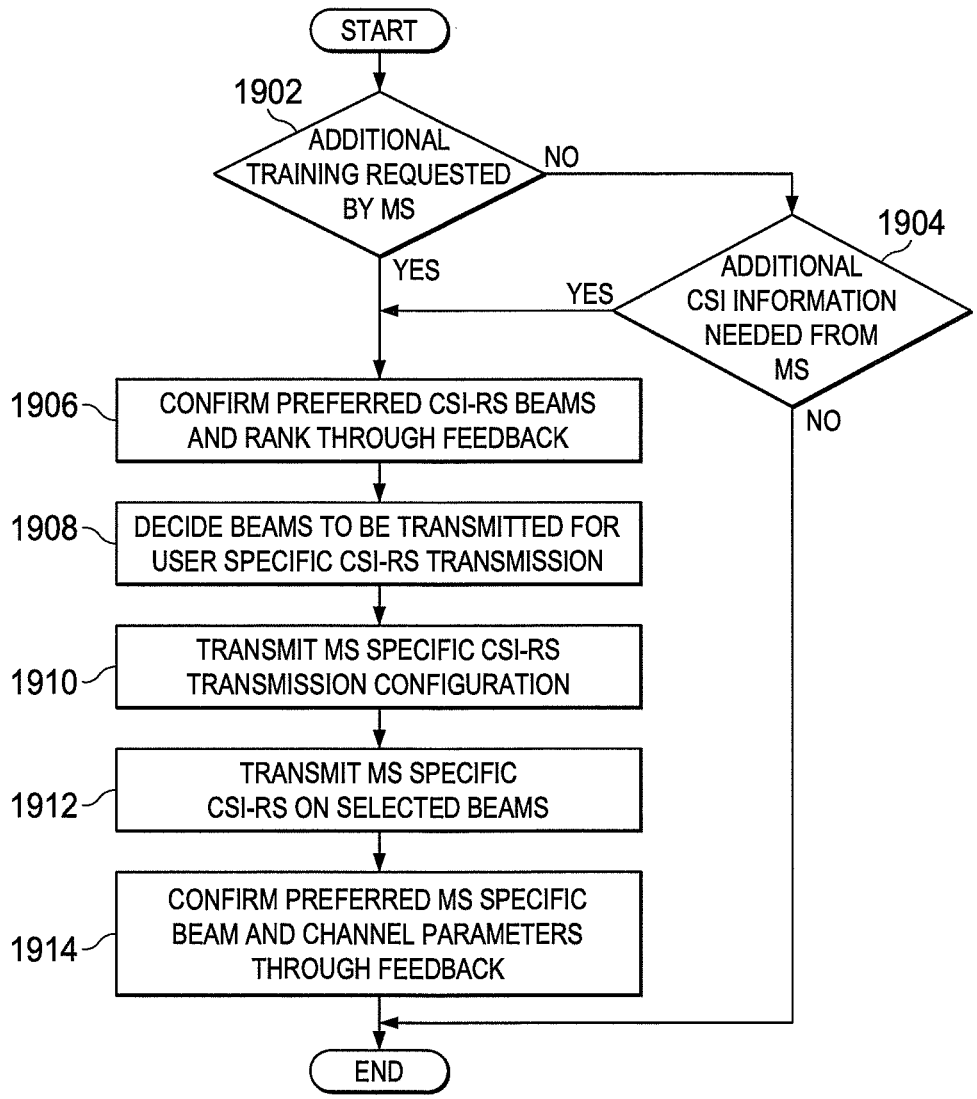
FIG. 19 illustrates a flowchart for MS specific CSI reference signal transmission at a BS according to embodiments of the present disclosure.

FIG. 19 illustrates a flow chart for MS specific CSI-reference signal transmission at a BS, such as BS 102. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented in, for example, one or more of a base station and a mobile station. BS 102 can comprise one or more digital or analog processors configured to perform one or more steps depicted in the flow diagram of FIG. 19.

MS specific CSI-RS is transmitted by BS 102 based on one of receiving a request for additional training from MS 116, determined at 1902, or if BS 102 needs updated channel state information from MS 116, determined at 1904. If either of these triggers is satisfied, then the MS specific CSI-RS involves the following steps. At 1906, BS 102 confirms the most recent feedback of the preferred beam index and rank based on the periodic common CSI-RS transmission. A set of beams to be used for transmitting MS specific CSI-RS is identified at 1908 and a configuration message indicating the resources for MS specific CSI-RS feedback is transmitted to MS 116 at 1910. After the MS specific CSI-RS transmission configuration is transmitted, BS 102 transmits, at 1912, the MS specific CSI-RS on the selected beams. MS 116 processes the MS specific CSI-RS and confirms the preferred MS specific beam and other channel parameters through feedback to BS 102, which is confirmed by BS 102 at 1914.

Figure 20:
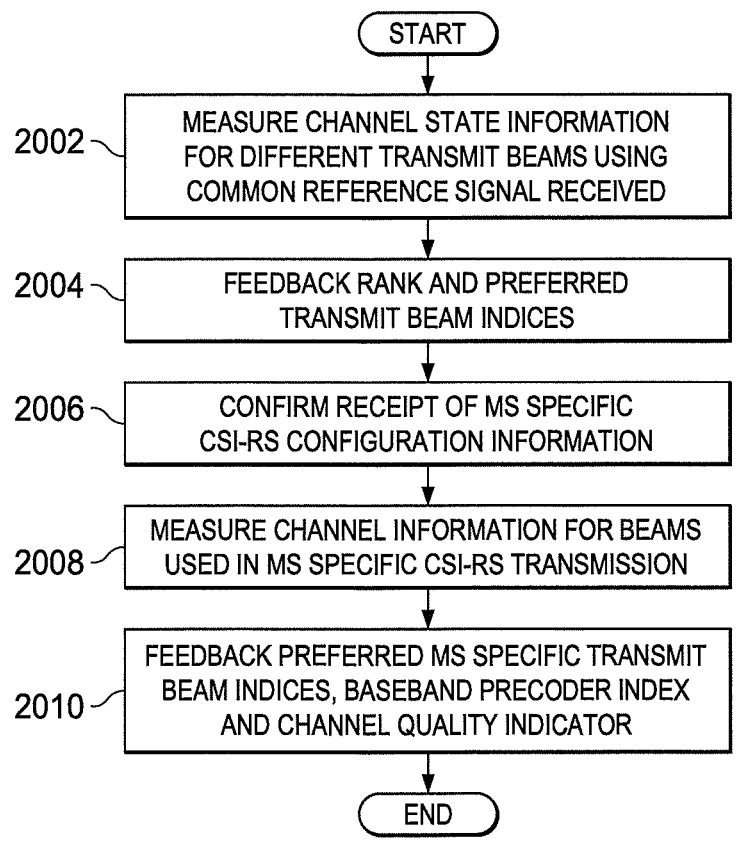
FIG. 20 illustrates a flowchart indicating behavior of an MS for common and MS specific reference signal transmission and feedback according to embodiments of the present disclosure.

FIG. 20 illustrates a flow chart indicating behavior of an MS, such as MS 116, for common and MS specific reference signal transmission and feedback. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented in, for example, one or more of a base station and a mobile station. MS 116 can comprise one or more digital or analog processors configured to perform one or more steps depicted in the flow diagram of FIG. 20.

At 2002, MS 116 measures all common CSI-RS transmissions that are transmitted by a BS, such as BS 102. Using the common CSI-RS transmission, MS 116 identifies the preferred beam indices and the associated rank of the channel. On assignment of a feedback channel, MS 102 transmits, at 2004, the preferred beam indices, rank of the channel and other parameters to BS 102. BS 102 schedules MS specific CSI-RS transmission and indicates its intention by transmitting a configuration message for it. At 2006, MS 116 interprets the configuration message, confirms receipt of the configuration message, and prepares to receive MS specific CSI-RS at 2008, MS 116 measures channel information for beams used in MS specific CSI-RS transmission. On receipt of the MS specific CSI-RS, MS 116 processes the message and identifies the preferred transmission parameters for transmission from BS 102. MS 116 transmits the estimated channel quality, preferred beam indices on a feedback channel to BS 102 at 2010.

Figure 21:
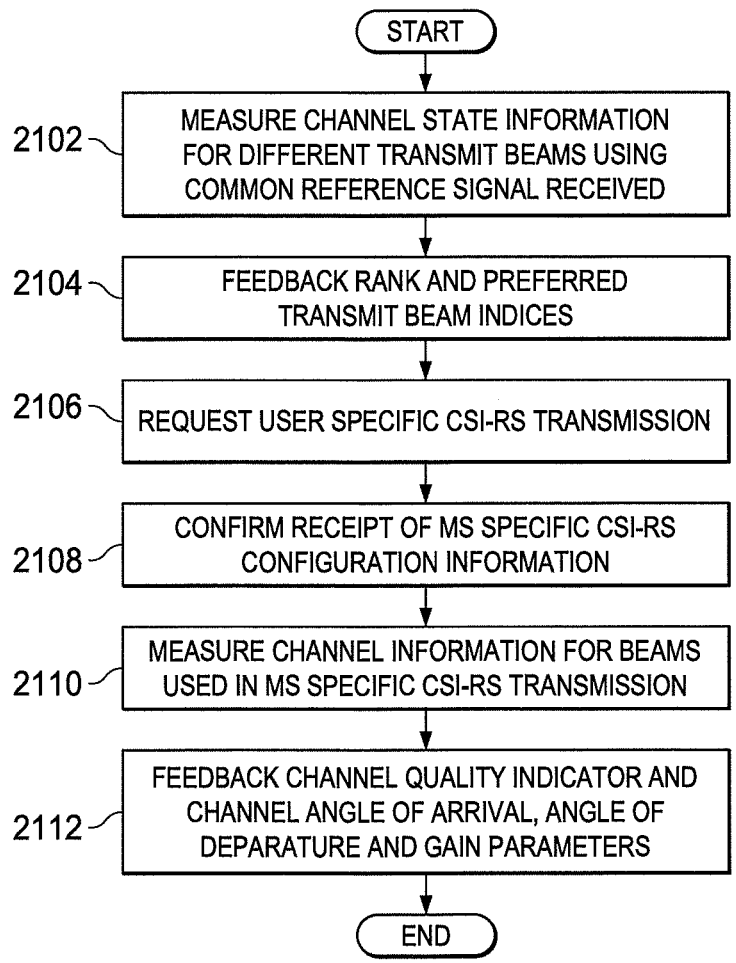
FIG. 21 illustrates a flowchart indicating behavior of an MS, such as MS 116, for common and MS requested MS specific reference signal transmission and feedback according to embodiments of the present disclosure.

FIG. 21 illustrates a flow chart indicating behavior of an MS, such as MS 116, for common and MS requested MS specific reference signal transmission and feedback. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented in, for example, one or more of a base station and a mobile station. MS 116 can comprise one or more digital or analog processors configured to perform one or more steps depicted in the flow diagram of FIG. 21.

The behavior of an MS with advanced receiver capabilities is illustrated in FIG. 21. At 2102, MS 116 measures all common CSI-RS transmissions. Using the common CSI-RS transmission, MS 116 feeds back the preferred beam indices and the associated rank of the channel. On assignment of a feedback channel, the MS transmits, at 2104, the preferred beam indices, rank of the channel and other parameters to a BS, such as BS 102. If necessary, MS 116 requests, at 2106, additional reference symbols to estimate channel parameters like angle of arrival, angle of departure, and gain for each path of the channel. BS 102 can schedule MS specific CSI-RS transmission and indicates its intention by transmitting a configuration message for it. At 2108, MS 116 interprets the configuration message, confirms receipt of the configuration message, and prepares to receive MS specific CSI-RS. On receipt of the MS specific CSI-RS, the MS processes it and measures and identifies the channel parameters at 2110. MS 116 transmits the estimated angle of arrival, angle of departure channel gain for different paths of the channel on a feedback channel to BS 102 at 2112.

Although the present disclosure has been described with certain embodiments, various changes and modifications may be suggested to one skilled in the art. It is intended that the present disclosure encompass such changes and modifications as fall within the scope of the appended claims.

What is claimed is:

1. A method for a mobile station (MS), the method comprising:
   receiving, from a base station (BS), a common channel state indicator-reference symbol (CSI-RS) over a millimeter wave radio frequency comprising a radio frequency of 30 giga hertz (GHz) to 300 GHz;
   sending, to the BS, a request message over the millimeter wave radio frequency to request additional reference symbols;
   sending, to the BS, a first feedback associated with the common CSI-RS over the millimeter wave radio frequency;
   receiving, from the BS, a configuration message for an MS-specific CSI-RS over the millimeter wave radio frequency;
   receiving, from the BS, the MS specific CSI-RS over the millimeter wave radio frequency; and
   sending, to the BS, a second feedback associated with the MS specific CSI-RS over the millimeter wave radio frequency.

2. The method of claim 1, wherein the receiving of the MS specific CSI-RS is in response to a request from the MS.

3. The method of claim 1, wherein the first feedback comprises at least one preferred beam index chosen from one or more indices of beams that have been used in the common CSI-RS transmission and a rank indication.

4. The method of claim 1, wherein the MS comprises an advanced receiver and the second feedback comprises estimated angle of arrival, angle of departure, and channel gain for each channel between the MS and the BS that is estimated via the advanced receiver.

5. The method of claim 1, wherein the receiving of the MS specific CSI-RS is in response to the BS needing additional channel state infonnation.

6. The method of claim 1, wherein the first feedback comprises a preferred beam index and rank parameters while the second feedback comprises channel parameters that capture instantaneous channel information and include a baseband precoder and channel state information.

7. The method of claim 1, wherein the MS specific CSI-RS is transmitted over the channel in accordance with a spatial direction indicated by the MS.

8. The method of claim 1, wherein the MS specific CSI-RS is transmitted to estimate baseband precoding to be used in multi-stream transmission.

9. The method of claim 1, wherein the MS-specific CSI-RS is specified by a different power beam-width, a different beamforming gain, and a different overhead than the common CSI-RS.

10. The method of claim 1, wherein the second feedback comprises at least one preferred data beam index, a spatial beam direction, and a channel quality indicator for each channel between the MS and the BS.

11. A mobile station (MS) comprising:
    a transceiver; and
    processing circuitry configured to:
    receive, via the transceiver, a common channel state indicator-reference symbol (CSI-RS) from a base station (BS) over a millimeter wave radio frequency comprising a radio frequency of 30 giga hertz (GHz) to 300 GHz;
    send, via the transceiver, a request message to the BS over the millimeter wave radio frequency to request additional reference symbols;
    send, via the transceiver, a first feedback associated with the common CSI-RS to the BS over the millimeter wave radio frequency;
    receive, via the transceiver, a configuration message for an MS-specific CSI-RS from the BS over the millimeter wave radio frequency;
    receive, via the transceiver, the MS specific CSI-RS from the BS over the millimeter wave radio frequency; and
    send, via the transceiver, a second feedback associated with the MS specific CSI-RS to the BS over the millimeter wave radio frequency.

12. The MS of claim 11, wherein the receipt of the MS specific CSI-RS is in response to a request from the MS.

13. The MS of claim 11, wherein the first feedback comprises at least one preferred beam index chosen from one or more indices of beams that have been used in the common CSI-RS transmission and a rank indication.

14. The MS of claim 11, wherein the transceiver comprises an advanced receiver and the second feedback comprises estimated angle of arrival, angle of departure, and channel gain for each channel between the MS and the BS that is estimated via the advanced receiver.

15. The MS of claim 11, wherein receipt of the MS specific CSI-RS is in response to a need of the BS for additional channel state information.

16. The MS of claim 11, wherein the first feedback comprises a preferred beam index and rank parameters while the second feedback comprises channel parameters that capture instantaneous channel information and include a baseband precoder and channel state information.

17. The MS of claim 11, wherein the MS specific CSI-RS is transmitted over the channel in accordance with a spatial direction indicated by the MS.

18. The MS of claim 11, wherein the MS specific CSI-RS is transmitted to estimate baseband precoding to be used in multi-stream transmission.

19. A base station (BS) comprising:
a transceiver; and
processing circuitry configured to:
- send, via the transceiver, a common channel state indicator-reference symbol (CSI-RS) to a mobile station (MS) over a millimeter wave radio frequency comprising a radio frequency of 30 giga hertz (GHz) to 300 GHz;
- receiving, via the transceiver, a request message from the MS over the millimeter wave radio frequency to request additional reference symbols;
- receive, via the transceiver, a first feedback associated with the common CSI-RS from the MS over the millimeter wave radio frequency;
- send, via the transceiver, a configuration message for an MS specific CSI-RS to the MS over the millimeter wave radio frequency;
- send, via the transceiver, the MS specific CSI-RS over the millimeter wave radio frequency; and
- receive, via the transceiver, a second feedback associated with the MS specific CSI-RS from the MS over the millimeter wave radio frequency.

20. The BS of claim 19, wherein the sending of the MS specific CSI-RS is in response to a request from the MS.

21. The BS of claim 19, wherein the first feedback comprises at least one preferred beam index chosen from one or more indices of beams that have been used in the common CSI-RS transmission and a rank indication.

22. The BS of claim 19, wherein the second feedback comprises estimated angle of arrival, angle of departure, and channel gain for each channel between the MS and the BS that is estimated via an advanced receiver of the MS.

23. The BS of claim 19, wherein sending of the MS specific CSI-RS is in response to a need of the BS for additional channel state information.

24. The BS of claim 19, wherein the first feedback comprises a preferred beam index and rank parameters while the second feedback comprises channel parameters that capture instantaneous channel information and include a baseband precoder and channel state information.

25. The BS of claim 19, wherein the MS specific CSI-RS is transmitted over the channel in accordance with a spatial direction indicated by the MS.

26. The BS of claim 19, wherein the MS specific CSI-RS is transmitted to estimate baseband precoding to be used in multi-stream transmission.

27. A wireless communication system that includes a number of base station (BSs) configured to communicate with a number of mobile stations (MS), the wireless communications system comprising:
at least one base station (BS) comprising:
a plurality of antenna coupled to a transceiver; and
processing circuitry configured to:
- send, via the transceiver, a common channel state indicator-reference symbol (CSI-RS) to a mobile station (MS) over a millimeter wave radio frequency comprising a radio frequency of 30 giga hertz (GHz) to 300 GHz;
- receive, via the transceiver, a request message over the millimeter wave radio frequency to request additional reference symbols;
- receive, via the transceiver, a first feedback associated with the common CSI-RS from the MS over the millimeter wave radio frequency;
- send, via the transceiver, a configuration message for an MS specific CSI-RS to the MS over the millimeter wave radio frequency;
- send, via the transceiver, the MS specific CSI-RS over the millimeter wave radio frequency; and
- receive, via the transceiver, a second feedback associated with the MS specific CSI-RS from the MS over the millimeter wave radio frequency.

28. The wireless communications system of claim 27, wherein the sending of the MS specific CS1-RS is in response to a request from the MS.

29. The wireless communications system of claim 27, wherein the first feedback comprises at least one preferred beam index chosen from one or more indices of beams that have been used in the common CS1-RS transmission and a rank indication.

30. The wireless communications system of claim 27, wherein the second feedback comprises estimated angle of arrival, angle of departure, and channel gain for each channel between the MS and the BS that is estimated via an advanced receiver of the MS.

31. The wireless communications system of claim 27, wherein sending of the MS specific CSI-RS is in response to a need of the BS for additional channel state information.

32. The wireless communications system of claim 27, wherein the first feedback comprises a preferred beam index and rank parameters while the second feedback comprises channel parameters that capture instantaneous channel information and include a baseband precoder and channel state information.

33. The wireless communications system of claim 27, wherein the MS specific CSI-RS is transmitted over the channel in accordance with a spatial direction indicated by the MS.

34. The wireless communications system of claim 27, wherein the MS specific CSI-RS is transmitted to estimate baseband precoding to be used in multi-stream transmission.

* * * * *